(12) United States Patent
Tie et al.

(10) Patent No.: US 12,089,158 B2
(45) Date of Patent: Sep. 10, 2024

(54) METHOD AND APPARATUS FOR SENDING INDICATION INFORMATION

(71) Applicant: Huawei Technologies Co., Ltd., Shenzhen (CN)

(72) Inventors: Xiaolei Tie, Shanghai (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 337 days.

(21) Appl. No.: 17/709,172

(22) Filed: Mar. 30, 2022

(65) Prior Publication Data
US 2022/0225234 A1 Jul. 14, 2022

Related U.S. Application Data

(63) Continuation of application No. PCT/CN2019/109708, filed on Sep. 30, 2019.

(51) Int. Cl.
*H04W 52/02* (2009.01)
*H04W 72/0446* (2023.01)
(Continued)

(52) U.S. Cl.
CPC ... *H04W 52/0232* (2013.01); *H04W 72/0446* (2013.01); *H04W 72/0453* (2013.01); *H04W 72/23* (2023.01)

(58) Field of Classification Search
CPC ............. H04W 52/0232; H04W 72/23; H04W 72/0446; H04W 72/0453
(Continued)

(56) References Cited

U.S. PATENT DOCUMENTS

| 11,653,292 | B2 * | 5/2023 | Azizi | H04W 48/18 |
| | | | | 370/329 |
| 2015/0223085 | A1 * | 8/2015 | Siomina | H04W 52/0229 |
| | | | | 370/252 |

(Continued)

FOREIGN PATENT DOCUMENTS

| CN | 108541047 A | 9/2018 |
| CN | 108696919 A | 10/2018 |
| WO | 2018175760 A1 | 9/2018 |

OTHER PUBLICATIONS

Huawei et al, "PDCCH based power saving signal/channel," 3GPP TSG RAN WG1 Meeting #96bis, Xi'an, China, R1-1903988, Total 7 pages, 3rd Generation Partnership Project, Valbonne, France (Apr. 8-12, 2019).

(Continued)

*Primary Examiner* — Nghi H Ly
(74) *Attorney, Agent, or Firm* — Leydig, Voit & Mayer, Ltd.

(57) ABSTRACT

This application discloses a method and an apparatus for sending indication information. The method includes: A network device determines a location of first indication information in at least one piece of second indication information based on first information. The first information includes at least one of identification information of a first terminal device and time information of a first preset time period, the first terminal device is one of to-be-woken-up terminal devices that are within a discontinuous reception outside active time period, and the first indication information indicates the first terminal device to enter an inside active time period within a preset time period. The network device sends the second indication information on a time-frequency resource corresponding to the first preset time period. The second indication information indicates at least (Continued)

one to-be-woken-up terminal device to enter an inside active time period within a corresponding time period.

20 Claims, 11 Drawing Sheets

(51) Int. Cl.
*H04W 72/0453* (2023.01)
*H04W 72/23* (2023.01)

(58) Field of Classification Search
USPC ........ 370/318, 328, 329, 338, 341, 345, 350
See application file for complete search history.

(56) References Cited

U.S. PATENT DOCUMENTS

| | | | |
|---|---|---|---|
| 2016/0081022 A1* | 3/2016 | Haneji | .............. H04W 52/0212 |
| | | | 370/311 |
| 2016/0192420 A1* | 6/2016 | Kim | ........................ H04W 4/06 |
| | | | 370/329 |
| 2019/0254110 A1 | 8/2019 | He et al. | |
| 2019/0297577 A1 | 9/2019 | Lin et al. | |

OTHER PUBLICATIONS

Qualcomm Incorporated, "Potential Techniques for UE Power Saving," 3GPP TSG-RAN WG1 #96, Athens, Greece, R1-1903016, Total 33 pages, 3rd Generation Partnership Project, Valbonne, France (Feb. 25-Mar. 1, 2019).

* cited by examiner

METHOD AND APPARATUS FOR SENDING INDICATION INFORMATION

CROSS-REFERENCE TO RELATED APPLICATIONS

This application is a continuation of International Application No. PCT/CN2019/109708, filed on Sep. 30, 2019, the disclosure of which is hereby incorporated by reference in its entirety.

TECHNICAL FIELD

Embodiments of this application relate to the communication field, and in particular, to a method and an apparatus for sending indication information.

BACKGROUND

In a wireless communication system, a terminal device has two states. One is a connected state, which indicates that the terminal device has established a connection to a network device and can directly communicate with the network device. The other is an idle state, or referred to as a sleep state, which indicates that the terminal device cannot directly communicate with the network device.

In a long term evolution (LTE) communication system and a new radio (NR) communication system, a discontinuous reception (DRX) mechanism or a connected-discontinuous reception (C-DRX) mechanism may be used to reduce power consumption of a terminal device in the connected state. When the terminal device has no service data to send or receive, the terminal device may enter the idle state to reduce power consumption. When the network device needs to send service data to the terminal device or requires the terminal device to report some pieces of service data, the network device may notify the terminal device by using a paging mechanism. A terminal device in the idle state is periodically woken up to monitor a physical downlink control channel (PDCCH), and detects whether a paging scheduling message exists in the PDCCH. If the paging scheduling message exists and paging scheduling is specific to the terminal device, the terminal device in the idle state is switched to the connected state, to send or receive service data. A time location at which the terminal device is woken up is referred to as a paging occasion (PO).

The connected-DRX mechanism may also be configured for the terminal device in the connected state. In the connected-DRX mechanism, the terminal device is periodically woken up to monitor a specific type of PDCCH (for example, a PDCCH used to schedule uplink and downlink data) within ON duration. Once that the specific type of PDCCH sends associated downlink control information (DCI) is detected, a DRX inactivity timer is triggered.

In actual application, the network device does not send the DCI to the terminal device on every PO or within every ON duration. In a plurality of cases, it is an invalid operation that the terminal device is periodically woken up to detect the DCI, which increases power consumption. Therefore, a wake-up signal (WUS) function is introduced in a narrow band Internet of Things (NB-IoT) system and the NR system. To be specific, on a PO or within specific ON duration, if the network device determines to send the DCI to the terminal device to schedule the uplink and downlink data, the network device sends a WUS before the PO or the ON duration arrives; and if the network device does not determine to send the DCI to the terminal device to schedule the uplink and downlink data, the network device does not send the WUS. The terminal device attempts to detect the WUS before the PO or the ON duration arrives, and detects the specific type of PDCCH on a subsequent PO or within subsequent ON duration only after detecting the WUS, to detect whether the network device sends the DCI. If the WUS is not detected, the terminal device does not detect the specific type of the PDCCH on the subsequent PO or within the subsequent ON duration. Power consumption and complexity of detecting the WUS are far less than power consumption and complexity of detecting the specific type of PDCCH, and a probability that the network device sends the specific type of PDCCH within an idle time period or when the connected-DRX mechanism is configured is not high. Therefore, the WUS function can greatly reduce power consumption of the terminal device.

Currently, the network device indicates WUSs of a plurality of terminal devices by using a bitmap, and the WUS of each terminal device consistently correspond to one bit in the bitmap. When a bit is set, it indicates that a corresponding terminal device is woken up. When the bit is not set, it indicates that the corresponding terminal device is not woken up. When a quantity of terminal devices is greater than a quantity of bits in the bitmap, a plurality of terminal devices consistently share a same bit. In this case, a WUS conflict continuously occurs among the terminal devices that consistently share the same bit, and it is difficult to achieve fairness for all the terminal devices.

SUMMARY

Embodiments of this application provide a method and an apparatus for sending indication information, to improve fairness in receiving WUSs by terminal devices.

To achieve the foregoing objective, the following technical solutions are used in the embodiments of this application.

According to a first aspect, a method for sending indication information is provided. The method includes: A network device determines a location of first indication information in at least one piece of second indication information based on first information. The first information includes at least one of identification information of a first terminal device and time information of a first preset time period, the first terminal device is one of to-be-woken-up terminal devices that are within a discontinuous reception outside active time period, and the first indication information indicates the first terminal device to enter an inside active time period within a preset time period. The network device sends the second indication information on a time-frequency resource corresponding to the first preset time period. The second indication information indicates at least one to-be-woken-up terminal device to enter an inside active time period within a corresponding time period.

According to the method for sending the indication information provided in this application, the location of the first indication information in the at least one piece of second indication information is determined based on the first information. The first information includes the at least one of the identification information of the first terminal device and the time information of the first preset time period, the first terminal device is one of the to-be-woken-up terminal devices that are within the discontinuous reception outside active time period, and the first indication information indicates the first terminal device to enter the inside active time period within the preset time period. The second indication information indicates the at least one to-be-woken-up terminal device to enter the inside active time period within the corresponding time period. It can be learned from foregoing description that, when one of the identification information of the first terminal device and the time information of the first preset time period changes, locations of first indication information corresponding to different terminal devices may be different, and even locations of first indication information for a same terminal device in different pieces of second indication information may also be different. In this way, random or pseudo-random distribution of locations is implemented. WUSs of the terminal devices are pseudo-randomized, to achieve fairness for all the terminal devices as much as possible.

In a possible implementation, that a network device determines a location of first indication information in at least one piece of second indication information based on first information includes: The network device determines the location of the first indication information in the second indication information based on the first information when the to-be-woken-up terminal device meets a preset condition.

In a possible implementation, the method further includes: The network device determines the location of the first indication information in the second indication information based on configuration information of the to-be-woken-up terminal device when the to-be-woken-up terminal device does not meet the preset condition.

In a possible implementation, that the network device determines the location of the first indication information in the second indication information based on the first information when the to-be-woken-up terminal device meets a preset condition includes: The network device receives a support capability of the first terminal device from the first terminal device. The network device determines the location of the first indication information in the second indication information based on the support capability and the first information when the to-be-woken-up terminal device meets the preset condition.

In a possible implementation, the method further includes: The network device sends third indication information to the first terminal device. The third indication information indicates the first terminal device to determine the location of the first indication information in the second indication information based on the first information, or indicate the first terminal device to determine the location of the first indication information in the second indication information based on the configuration information.

In a possible implementation, the third indication information is carried in a dynamic indication of downlink control information (DCI) or in a radio resource control (RRC) message for the first terminal device.

In a possible implementation, the to-be-woken-up terminal device indicated by the second indication information is a terminal device that is capable of entering the inside active time period within the corresponding time period within a second preset time period after the first preset time period.

In a possible implementation, the second indication information is indicated by using a bitmap, and first indication information of each terminal device corresponds to one bit in the bitmap.

In a possible implementation, if first indication information in all pieces of second indication information takes effect, the first indication information indicates the first terminal device to enter the inside active time period within the preset time period.

In a possible implementation, the first information further includes a component carrier group identifier of the first terminal device.

In a possible implementation, the time information of the first preset time period includes at least one of the following information: a slot number and a symbol number of the first preset time period, a number of a control resource set (CORESET) in a slot, and a number of a wake-up signal monitoring occasion within the first preset time period.

According to a second aspect, a method for sending indication information is provided. The method includes: A first terminal device determines a location of first indication information in at least one piece of second indication information based on first information. The first information includes at least one of identification information of the first terminal device and time information of a first preset time period, the first terminal device is one of to-be-woken-up terminal devices that are within a discontinuous reception outside active time period, and the first indication information indicates the first terminal device to enter an inside active time period within a preset time period. The first terminal device receives the second indication information from a network device on a time-frequency resource corresponding to the first preset time period. The second indication information indicates at least one to-be-woken-up terminal device to enter an inside active time period within a corresponding time period.

According to the method for sending the indication information provided in this application, the location of the first indication information in the at least one piece of second indication information is determined based on the first information. The first information includes the at least one of the identification information of the first terminal device and the time information of the first preset time period, the first terminal device is one of the to-be-woken-up terminal devices that are within the discontinuous reception outside active time period, and the first indication information indicates the first terminal device to enter the inside active time period within the preset time period. The second indication information indicates the at least one to-be-woken-up terminal device to enter the inside active time period within the corresponding time period. It can be learned from foregoing description that, when one of the identification information of the first terminal device and the time information of the first preset time period changes, locations of first indication information corresponding to different terminal devices may be different, and even locations of first indication information for a same terminal device in different pieces of second indication information may also be different. In this way, random or pseudo-random distribution of locations is implemented. WUSs of the terminal devices are pseudo-randomized, to achieve fairness for all the terminal devices as much as possible.

In a possible implementation, the method further includes: The first terminal device sends a support capability of the first terminal device to the network device.

In a possible implementation, the method further includes: The first terminal device receives third indication information from the network device. The third indication information indicates the first terminal device to determine the location of the first indication information in the second indication information based on the first information, or indicate the first terminal device to determine the location of the first indication information in the second indication information based on configuration information of the terminal device.

In a possible implementation, the third indication information is carried in a dynamic indication of downlink control information (DCI) or in a radio resource control (RRC) message for the first terminal device.

In a possible implementation, the to-be-woken-up terminal device indicated by the second indication information is a terminal device that is capable of entering the inside active time period within the corresponding time period within a second preset time period after the first preset time period.

In a possible implementation, the second indication information is indicated by using a bitmap, and first indication information of each terminal device corresponds to one bit in the bitmap.

In a possible implementation, if first indication information in all pieces of second indication information takes effect, the first indication information indicates the first terminal device to enter the inside active time period within the preset time period.

In a possible implementation, the first information further includes a component carrier group identifier of the first terminal device.

In a possible implementation, the time information of the first preset time period includes at least one of the following information: a slot number and a symbol number of the first preset time period, a number of a control resource set (CORESET) in a slot, and a number of a wake-up signal monitoring occasion within the first preset time period.

According to a third aspect, a communication apparatus is provided, including a processing module and a transceiver module. The processing module is configured to determine a location of first indication information in at least one piece of second indication information based on first information. The first information includes at least one of identification information of a first terminal device and time information of a first preset time period, the first terminal device is one of to-be-woken-up terminal devices that are within a discontinuous reception outside active time period, and the first indication information indicates the first terminal device to enter an inside active time period within a preset time period. The transceiver module is configured to send the second indication information on a time-frequency resource corresponding to the first preset time period. The second indication information indicates at least one to-be-woken-up terminal device to enter an inside active time period within a corresponding time period.

In a possible implementation, the processing module is specifically configured to: determine the location of the first indication information in the second indication information based on the first information when the to-be-woken-up terminal device meets a preset condition.

In a possible implementation, the processing module is further configured to: determine the location of the first indication information in the second indication information based on configuration information of the to-be-woken-up terminal device when the to-be-woken-up terminal device does not meet the preset condition.

In a possible implementation, the transceiver module is further configured to receive a support capability of the first terminal device from the first terminal device; and the processing module is further configured to determine the location of the first indication information in the second indication information based on the support capability and the first information when the to-be-woken-up terminal device meets the preset condition.

In a possible implementation, the transceiver module is further configured to: send third indication information to the first terminal device. The third indication information indicates the first terminal device to determine the location of the first indication information in the second indication information based on the first information, or indicate the first terminal device to determine the location of the first indication information in the second indication information based on the configuration information.

In a possible implementation, the third indication information is carried in a dynamic indication of downlink control information (DCI) or in a radio resource control (RRC) message for the first terminal device.

In a possible implementation, the to-be-woken-up terminal device indicated by the second indication information is a terminal device that is capable of entering the inside active time period within the corresponding time period within a second preset time period after the first preset time period.

In a possible implementation, the second indication information is indicated by using a bitmap, and first indication information of each terminal device corresponds to one bit in the bitmap.

In a possible implementation, if first indication information in all pieces of second indication information takes effect, the first indication information indicates the first terminal device to enter the inside active time period within the preset time period.

In a possible implementation, the first information further includes a component carrier group identifier of the first terminal device.

In a possible implementation, the time information of the first preset time period includes at least one of the following information: a slot number and a symbol number of the first preset time period, a number of a control resource set (CORESET) in a slot, and a number of a wake-up signal monitoring occasion within the first preset time period.

According to a fourth aspect, a communication apparatus is provided, including a processing module and a transceiver module. The processing module is configured to determine a location of first indication information in at least one piece of second indication information based on first information. The first information includes at least one of identification information of a first terminal device and time information of a first preset time period, the first terminal device is one of to-be-woken-up terminal devices that are within a discontinuous reception outside active time period, and the first indication information indicates the first terminal device to enter an inside active time period within a preset time period. The transceiver module is configured to receive the second indication information from a network device on a time-frequency resource corresponding to the first preset time period. The second indication information indicates at least one to-be-woken-up terminal device to enter an inside active time period within a corresponding time period.

In a possible implementation, the transceiver module is further configured to send a support capability of the first terminal device to the network device.

In a possible implementation, the transceiver module is further configured to receive third indication information from the network device. The third indication information indicates the first terminal device to determine the location of the first indication information in the second indication information based on the first information, or indicate the first terminal device to determine the location of the first indication information in the second indication information based on configuration information of the terminal device.

In a possible implementation, the third indication information is carried in a dynamic indication of downlink control information (DCI) or in a radio resource control (RRC) message for the first terminal device.

In a possible implementation, the to-be-woken-up terminal device indicated by the second indication information is a terminal device that is capable of entering the inside active time period within the corresponding time period within a second preset time period after the first preset time period.

In a possible implementation, the second indication information is indicated by using a bitmap, and first indication information of each terminal device corresponds to one bit in the bitmap.

In a possible implementation, if first indication information in all pieces of second indication information takes effect, the first indication information indicates the first terminal device to enter the inside active time period within the preset time period.

In a possible implementation, the first information further includes a component carrier group identifier of the first terminal device.

In a possible implementation, the time information of the first preset time period includes at least one of the following information: a slot number and a symbol number of the first preset time period, a number of a control resource set (CORESET) in a slot, and a number of a wake-up signal monitoring occasion within the first preset time period.

According to a fifth aspect, a communication apparatus is provided. The communication apparatus includes a processor, a memory, and a transceiver. The processor is coupled to the memory; and when executing a computer program or instructions in the memory, the processor performs the method according to any one of the first aspect and the possible implementations of the first aspect, or performs the method according to any one of the second aspect and the possible implementations of the second aspect.

According to a sixth aspect, a chip is provided. The chip includes a processor and an interface, configured to: invoke a computer program stored in a memory from the memory, and run the computer program, to perform the method according to any one of the first aspect and the possible implementations of the first aspect, or perform the method according to any one of the second aspect and the possible implementations of the second aspect.

According to a seventh aspect, a computer-readable storage medium is provided. The computer-readable storage medium stores instructions, and when the instructions are run on a computer or a processor, the computer or the processor is enabled to perform the method according to any one of the first aspect and the possible implementations of the first aspect, or perform the method according to any one of the second aspect and the possible implementations of the second aspect.

According to an eighth aspect, a computer program product including instructions is provided. When the instructions are run on a computer or a processor, the computer or the processor is enabled to perform the method according to any one of the first aspect and the possible implementations of the first aspect, or perform the method according to any one of the second aspect and the possible implementations of the second aspect.

For technical effects of the third aspect to the eighth aspect, refer to content in the possible implementations of the first aspect to the fourth aspect.

DESCRIPTION OF EMBODIMENTS

Embodiments of this application may be applied to a time division duplex (TDD) scenario, and may also be applied to a frequency division duplex (FDD) scenario.

The embodiments of this application are described based on a $5^{th}$ generation 5G) communication network scenario in a wireless communication network. It should be noted that, the solutions in the embodiments of this application may alternatively be applied to another wireless communication network such as a $6^{th}$ generation mobile communication system, and a corresponding name may also be replaced with a name of a corresponding function in the another wireless communication network. The 5G mobile communication system in this application includes a non-standalone (NSA) 5G mobile communication system and/or a standalone (SA) 5G mobile communication system.

The embodiments of this application may be applied to a long term evolution (LTE) system such as an NB-IoT system, or may alternatively be applied to a long term evolution-advanced (LTE-Advanced, LTE-A) system. The embodiments of this application may also be applied to other wireless communication systems such as a global system for mobile communication (GSM) system, a universal mobile telecommunication system (UMTS), a code division multiple access (CDMA) system, and a new network device system. Specific embodiments are described by using an LTE system as an example below.

Figure 1:
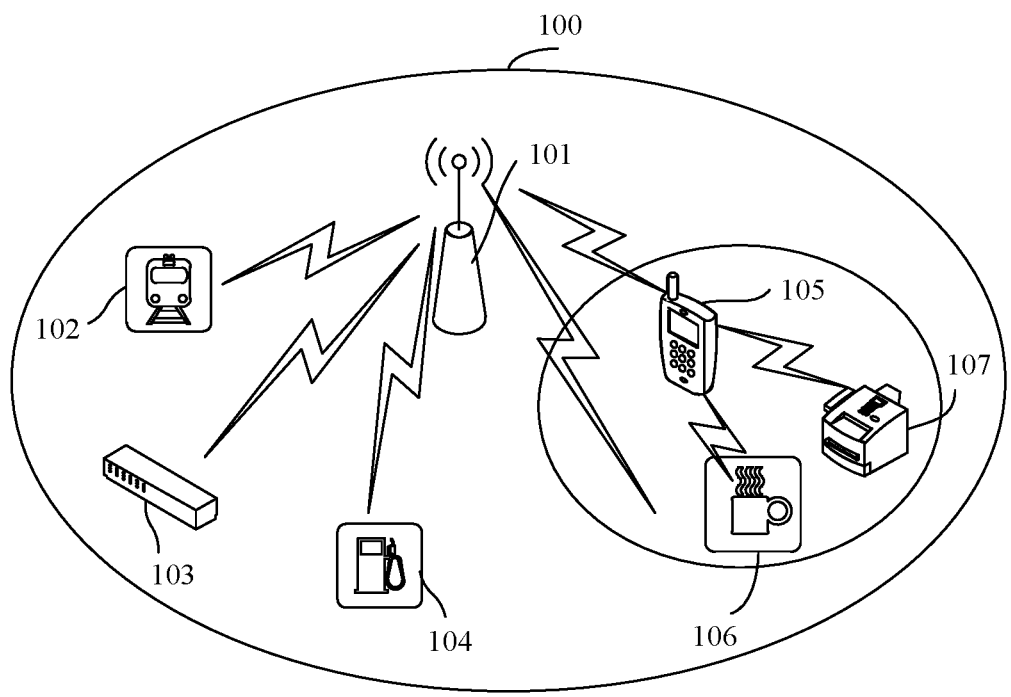
FIG. 1 is a schematic diagram of an architecture of a communication system according to an embodiment of this application.

As shown in FIG. 1, a communication system 100 provided in an embodiment of this application includes a network device 101 and terminal devices 102 to 107.

The terminal device in this embodiment of this application may be a device that provides a user with voice and/or data connectivity, a handheld device with a wireless connection function, or another processing device connected to a wireless modem. A wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchange voice and/or data with the radio access network. For example, the wireless terminal is a device, for example, user equipment (UE), a personal communication service (PCS) phone, a cordless phone, a session initiation protocol (SIP) phone, a wireless local loop (WLL) station, and a personal digital assistant (PDA). The wireless terminal may also be referred to as a system, a subscriber unit, a subscriber station, a mobile station, a mobile, a remote station, an access point, a remote terminal, an access terminal, a user terminal, a user agent), a user device, or user equipment. For example, the terminal device may be a high-speed railway communication device 102, a smart air conditioner 103, a smart fuel dispenser 104, a mobile phone 105, a smart teacup 106, or a printer 107. This is not limited in this application.

The network device in this embodiment of this application may be a base station. The base station may be configured to perform conversion between a received over-the-air frame and an Internet protocol (IP) packet, and is used as a router between the wireless terminal and a remaining part of the access network. The remaining part of the access network may include an IP network device. The base station may further coordinate attribute management of an air interface. For example, the base station may be a base transceiver station (BTS) in GSM or CDMA, or may be a NodeB in wideband code division multiple access (WCDMA), or may be an evolved NodeB (eNB or e-NodeB) in LTE, or may be a gNB in 5G. This is not limited in this embodiment of this application. The foregoing base station is merely an example for description. The network device may alternatively be a relay station, an access point, a vehicle-mounted device, a wearable device, or a device of another type.

Figure 2:
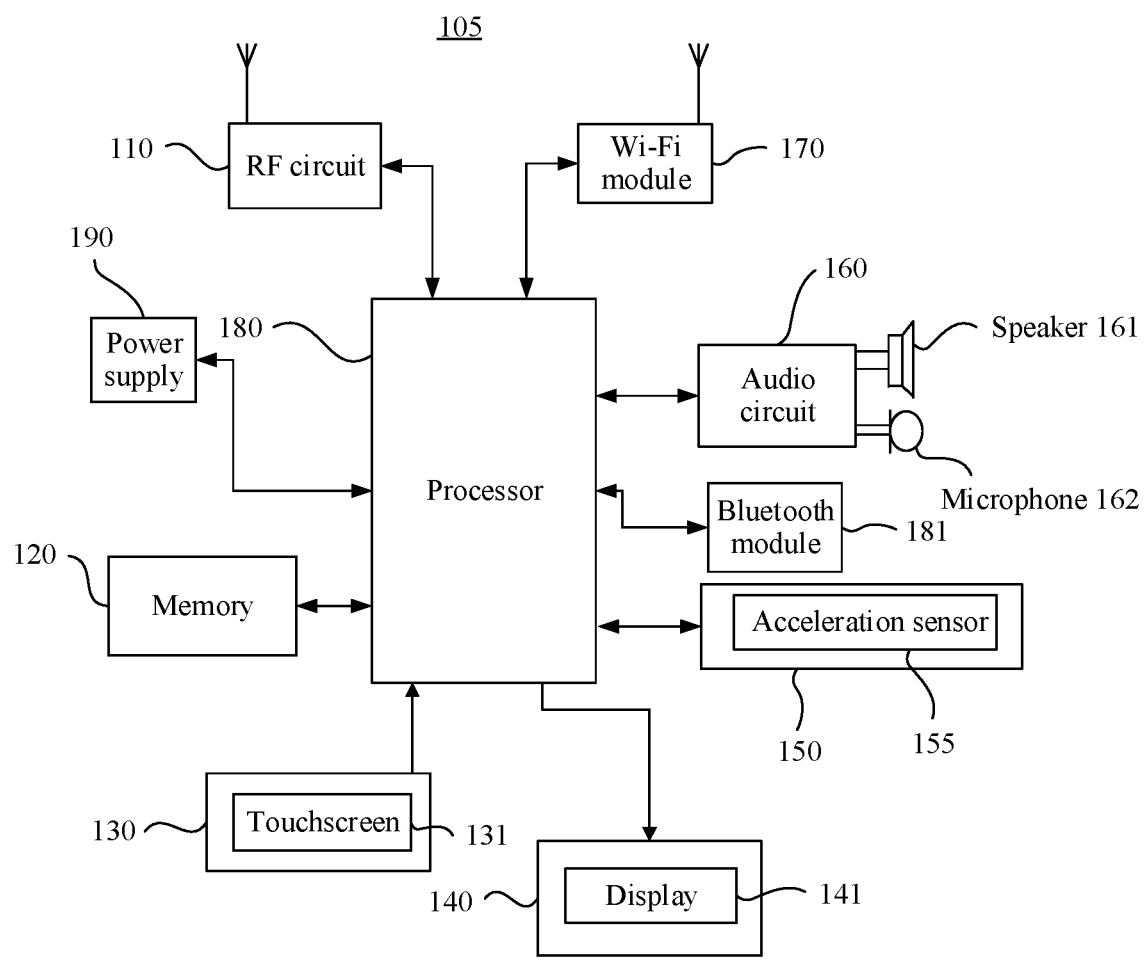
FIG. 2 is a schematic diagram of a structure of a terminal device according to an embodiment of this application.

As shown in FIG. 2, an example in which the terminal device is a mobile phone is used to describe a structure of the terminal device.

The terminal device 105 may include components such as a radio frequency (RF) circuit 110, a memory 120, an input unit 130, a display unit 140, a sensor 150, an audio circuit 160, a wireless fidelity (Wi-Fi) module 170, a processor 180, a Bluetooth module 181, and a power supply 190.

The RF circuit 110 may be configured to receive and send a signal during information receiving and sending or during a call. The RF circuit 110 may receive downlink data from the base station and then deliver the downlink data to the processor 180 for processing, and may send uplink data to the base station. Generally, the RF circuit includes but is not limited to devices such as an antenna, at least one amplifier, a transceiver, a coupler, a low noise amplifier, and a duplexer.

The memory 120 may be configured to store a software program and data. The processor 180 runs the software program or the data stored in the memory 120, to execute various functions of the terminal device 105 and process data. The memory 120 may include a high-speed random access memory, and may further include a nonvolatile memory, for example, at least one magnetic disk storage device, a flash memory, or another volatile solid-state storage device. The memory 120 stores an operating system that supports running of the terminal device 105, for example, an iOS® operating system developed by Apple, an Android® open-source operating system developed by Google, and a Windows® operating system developed by Microsoft. The memory 120 in this application may store the operating system and various application programs, and may further store code for performing the method described in the embodiments of this application.

The input unit 130 (for example, a touchscreen) may be configured to receive input digit or character information, and generate a signal input related to user settings and function control of the terminal device 105. Specifically, the input unit 130 may include a touchscreen 131 disposed on a front facet of the terminal device 105, and may collect a touch operation of a user on or near the touchscreen 131.

The display unit 140 (namely, a display) may be configured to display information entered by the user or information provided for the user, and graphical user interfaces (graphical user interfaces, GUI) of various menus of the terminal device 105. The display unit 140 may include a display 141 disposed on the front facet of the terminal device 105. The display 141 may be configured in a form of a liquid crystal display, a light-emitting diode, or the like. The display unit 140 may be configured to display various graphical user interfaces described in this application. The touchscreen 131 may cover the display 141, or the touchscreen 131 may be integrated with the display 141 to implement input and output functions of the terminal device 105. After being integrated, the touchscreen 131 and the display 141 may be briefly referred to as a touchscreen.

The terminal device 105 may further include at least one sensor 150, for example, a light sensor or a motion sensor. The terminal device 105 may further include another sensor, for example, a gyroscope, a barometer, a hygrometer, a thermometer, or an infrared sensor.

The audio circuit 160, a speaker 161, and a microphone 162 may provide an audio interface between the user and the terminal device 105. The audio circuit 160 may convert received audio data into an electrical signal, and transmit the electrical signal to the speaker 161. The speaker 161 converts the electrical signal into a sound signal for outputting. In addition, the microphone 162 converts a collected sound signal into an electrical signal. The audio circuit 160 receives the electrical signal, converts the electrical signal into audio data, and outputs the audio data to the RF circuit 110, to send the audio data to, for example, another terminal, or output the audio data to the memory 120 for further processing.

Wi-Fi is a short-distance wireless transmission technology. The terminal device 105 may help the user receive and send an email, browse a web page, access streaming media, and the like by using the Wi-Fi module 170. The Wi-Fi module 170 provides wireless broadband internet access for the user.

The processor 180 is a control center of the terminal device 105, is connected to each part of the entire terminal through various interfaces and lines, and executes various functions of the terminal device 105 and processes data by running or executing a software program stored in the memory 120 and by invoking data stored in the memory 120. In some embodiments, the processor 180 may include one or more processing units. An application processor and a baseband processor may be further integrated into the processor 180. The application processor mainly processes an operating system, a user interface, an application program, and the like. The baseband processor mainly processes wireless communication. It may be understood that the baseband processor may alternatively not be integrated into the processor 180. The processor 180 in this application may run the operating system and the application program, perform user interface display, provide a touch response, and perform the related method in the embodiments of this application.

The Bluetooth module 181 is configured to exchange information with another Bluetooth device with a Bluetooth module according to a Bluetooth protocol. For example, the terminal device 105 may establish a Bluetooth connection to a wearable electronic device (for example, a smartwatch) with a Bluetooth module by using the Bluetooth module 181, for data exchange.

The terminal device 105 further includes the power supply 190 (for example, a battery) that supplies power to the components. The power supply may be logically connected to the processor 180 by using a power management system, to execute functions such as charging, discharging, and power consumption management by using the power management system.

Figure 3:
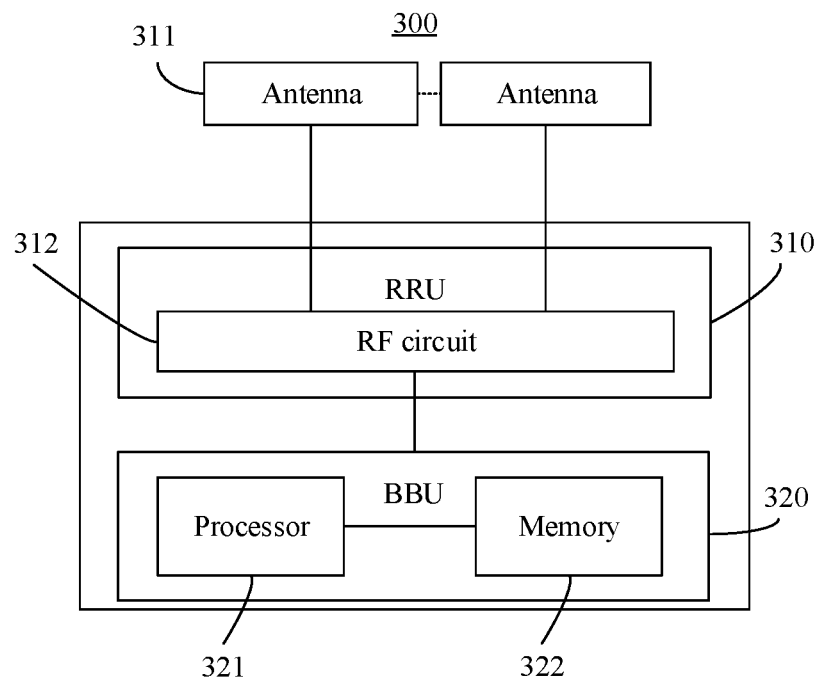
FIG. 3 is a schematic diagram of a structure of a network device according to an embodiment of this application.

As shown in FIG. 3, an embodiment of this application provides a schematic diagram of a structure of a network device. The network device 300 may include one or more radio frequency units, for example, a remote radio unit (RRU) 310 and one or more baseband units (BBU) (which may also be referred to as a digital unit (DU)) 320. The RRU 310 may be referred to as a transceiver unit. Optionally, the transceiver unit 310 may be further referred to as a transceiver machine, a transceiver circuit, a transceiver, a transmitter/receiver, or the like; and may include at least one antenna 311 and an RF circuit 312. Optionally, the transceiver unit 310 may include a receiving unit and a sending unit. The receiving unit may correspond to a receiver (or referred to as a receiving machine or a receiving circuit), and the sending unit may correspond to a transmitter (or referred to as a transmitting machine or a transmitting circuit). The RRU 310 is mainly configured to: receive and send a radio frequency signal, and perform conversion between the radio frequency signal and a baseband signal. For example, the RRU 310 is configured to send indication information to a terminal device. The BBU 320 is mainly configured to perform baseband processing, control the network device, and the like. The RRU 310 and the BBU 320 may be physically disposed together, or may be physically disposed separately, namely, a distributed base station.

The BBU 320 is a control center of the network device, may also be referred to as a processing unit, and is mainly configured to complete baseband processing functions such as channel coding, multiplexing, modulation, and spectrum spreading. For example, the BBU 320 may be configured to control the network device to perform the method in this application.

In an example, the BBU 320 may include one or more boards, and a plurality of boards may jointly support a radio access network (for example, an LTE network) having a single access standard, or may separately support radio access networks having different access standards (for example, an LTE network, a 5G network, or another network). The BBU 320 further includes a memory 321 and a processor 322. The memory 321 is configured to store necessary instructions and data. The processor 322 is configured to control the network device to perform a necessary action, for example, configured to control the network device to perform the method in this application. In this application, the processor 322 may be one or more processors. The memory 321 and the processor 322 may serve the one or more boards. In other words, the memory and the processor may be disposed on each board. Alternatively, the plurality of boards may share a same memory and a same processor. In addition, a necessary circuit may be further disposed on each board.

In addition, the network device is not limited to the foregoing forms, and may also be in another form. For example, the network device includes a BBU and an adaptive radio unit (ARU), or includes a BBU and an active antenna unit (AAU), or may be customer premises-equipment (CPE), or may be in another form. This is not limited in this application.

The following describes some concepts related to this application.

DRX Mechanism or C-DRX (Connected-DRX) Mechanism:

In an LTE communication system, the 3GPP proposes a DRX mechanism (further proposes a C-DRX mechanism) to reduce power consumption of a terminal device in a connected state. Unless otherwise specified, both the DRX mechanism and the C-DRX mechanism indicate the connected-DRX mechanism. The following uses the C-DRX mechanism as an example for description.

Figure 4:
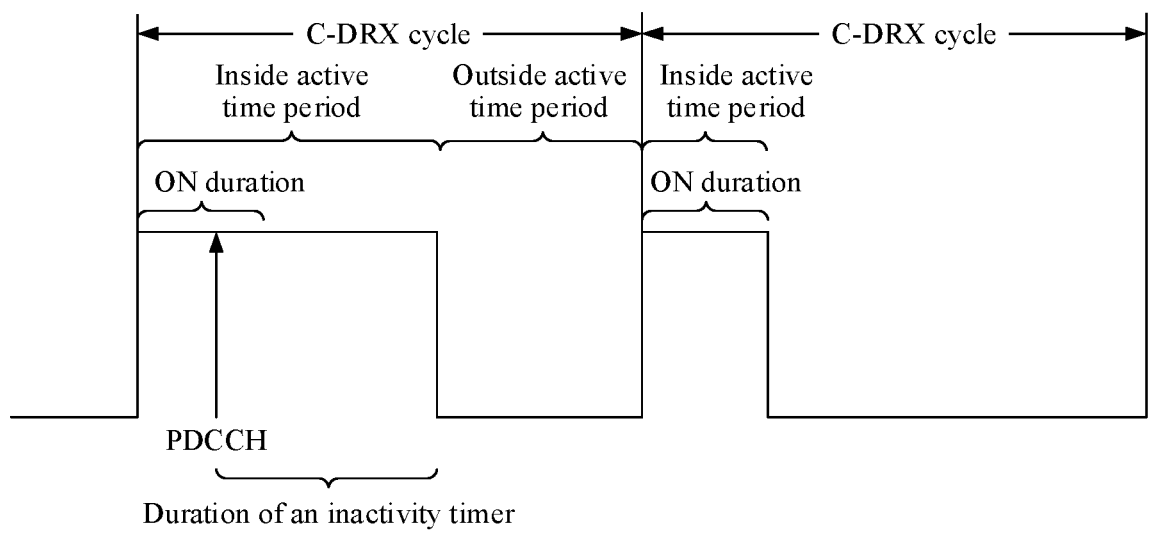
FIG. 4 is a schematic diagram of a C-DRX cycle according to an embodiment of this application.

FIG. 4 is a schematic diagram of one C-DRX cycle. One C-DRX cycle includes two time periods: an outside active time period and an inside active time period. The outside active time period may also be referred to as an opportunity for DRX, a DRX state, a dormancy time period, a stop time period, a sleep time period, or the like. The inside active time period may also be referred to as an active state, a wake-up time period, a wake-up state, or the like. Specific names are not limited in this application.

Within the outside active time period, a terminal device may disable a radio frequency transmit receiver, a baseband processing chip, and a memory, and retain only a crystal oscillator clock. Alternatively, the terminal device may monitor only a PDCCH scrambled by an RNTI, for example, a paging radio network temporary identity (P-RNTI), a temporary cell radio network temporary identity (TC-RNTI), and a system information radio network temporary identity (SI-RNTI). This depends on an implementation of the terminal device.

Within the inside active time period, the terminal device is woken up and may continuously monitor a PDCCH used to schedule newly transmitted uplink and downlink data. Specifically, downlink control information (DCI) in the PDCCH is detected to determine whether the PDCCH is used to schedule the newly transmitted uplink and downlink data. Uplink and downlink data includes a physical downlink shared channel (PDSCH) and a physical uplink shared channel (PUSCH). The terminal device receives the PDSCH or sends the PUSCH; and sends hybrid automatic repeat request (HARQ) feedback information.

A ratio of an outside active time period to an inside active time period in a same DRX cycle is variable. The following describes in detail with reference to FIG. 4.

When the terminal device is in a connected state, and when the inside active time period starts, the terminal device starts an ON duration timer, and timing duration of the timer is ON duration. The terminal device continuously monitors, within the ON duration, the PDCCH used to schedule the newly transmitted uplink and downlink data. Once the terminal device receives the PDCCH, the terminal device starts or restarts an inactivity timer. Before the inactivity timer expires, the terminal device may continue to monitor a specific type of PDCCH (for example, a PDCCH that is scrambled by a C-RNTI and that is used to schedule the uplink and downlink data). In this case, a time length of the inside active time period is greater than a time length of the ON duration or timing duration of the inactivity timer. Within the inside active time period, each time the terminal device receives the PDCCH used to schedule the newly transmitted uplink and downlink data, the terminal device starts or restarts the inactivity timer.

If the terminal device does not receive, within the ON duration, any PDCCH used to schedule the newly transmitted uplink and downlink data and the ON duration timer expires, or if the terminal device receives the PDCCH used to schedule the newly transmitted uplink and downlink data but the inactivity timer expires later, the terminal device enters the outside active time period. In a case in which no PDCCH used to schedule the newly transmitted uplink and downlink data is received within the ON duration and the ON duration timer expires, the time length of the inside active time period is equal to the time length of the ON duration.

Generally, the terminal device is not woken up only at a start moment of the ON duration, but is first woken up in several slots before the ON duration arrives; and receives a downlink reference signal to perform time-frequency offset synchronization. In this way, timing and a working frequency of the system are prevented from being deviated from those of a network device due to long-time dormancy of the terminal device. In addition, the terminal device may first attempt to receive a downlink synchronization signal and update a system message, to prevent system synchronization from being deviated and the system message from being deviated after the terminal device moves from one cell to another cell.

Wake-Up Signal (WUS) Function:

The WUS function is a function introduced in the NB-IoT system for the first time, is used to further reduce power consumption of the terminal device, and is mainly used in a radio resource control (RRC) idle-state paging mechanism.

In an idle state, the terminal device is generally in a dormancy state, but needs to be woken up every period of time to attempt to receive a paging scheduling message. A time location at which the terminal device is woken up is referred to as a paging occasion PO). In actual application, the network device does not send the paging scheduling message on every PO. In most cases, it is an invalid operation that the terminal device is periodically woken up to detect the paging scheduling message, which increases power consumption. Therefore, the WUS function is introduced in the NB-IoT system. To be specific, if the network device determines to send the paging scheduling message to the terminal device on a PO, the network device sends a WUS before the PO arrives. If the network device does not determine to send the paging scheduling message to the terminal device on the PO, the network device does not send the WUS. The terminal device attempts to detect the WUS before the PO arrives, and detects the paging scheduling message on a subsequent PO only after the WUS is detected. If the WUS is not detected, the terminal device does not detect the paging scheduling message on the subsequent PO. Power consumption and complexity of detecting the WUS are far less than power consumption and complexity of detecting the paging scheduling message, and a probability that the network device sends the paging scheduling message within an idle time period is not high. Therefore, the WUS function can greatly reduce power consumption of the terminal device.

PDCCH-Based WUS (which May be Referred to as a PDCCH-WUS):

For a terminal device having a DRX function, the $3^{rd}$ generation partnership project (3GPP) introduces the PDCCH-based WUS function into a power consumption saving characteristic of an NR release 16, to be specific, a WUS is carried by using a PDCCH. The function may be applied to a terminal device in an RRC connected state, and indicates whether the terminal device is woken up and monitors the PDCCH used to schedule the uplink and downlink data within one or more pieces of subsequent ON duration.

Figure 5:
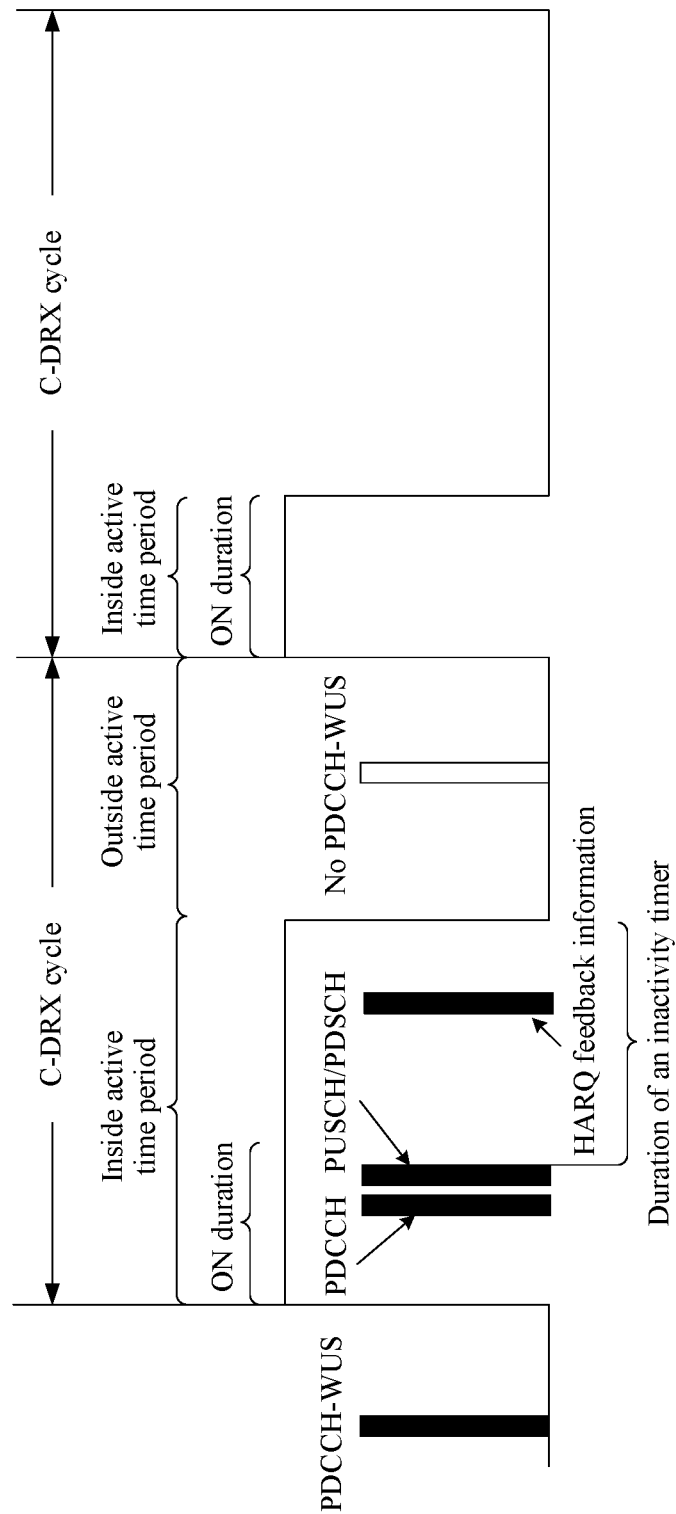
FIG. 5 is a schematic diagram in which conditions are met when a network device sends a PDCCH-WUS according to an embodiment of this application.

As shown in FIG. 5, the network device needs to meet the following conditions to send the PDCCH-WUS:

1. Search space of a PDCCH carrying a WUS is within the outside active time period, and is sent within a time period before the ON duration.

2. Within subsequent ON duration, there is a PDCCH that is sent to the terminal device and that is used to schedule a PDSCH or a PUSCH. In other words, only when there is the uplink and downlink data, the network device needs to schedule the terminal device to send the PUSCH or receive the PDSCH, and the network device needs to wake up the terminal device, so that the terminal device enters the inside active time period to monitor the PDCCH used to schedule the uplink and downlink data. The network device sends the PDCCH-WUS only in this case. Otherwise, the network does not send the PDCCH-WUS. Alternatively, although the network sends the PDCCH-WUS, the PDCCH-WUS is sent to a plurality of terminals. For a fixed location configured for a terminal, a bit may be used to indicate whether the terminal device is woken up.

Before ON duration of one DRX cycle arrives, if the network device configures the PDCCH-WUS, the terminal device may detect the PDCCH-WUS on a section of frequency domain resources (which may be referred to as the search space) within a fixed time period.

If the terminal device detects the PDCCH-WUS, it indicates that the PDCCH used to schedule the terminal device to send the PUSCH or receive the PDSCH exists within ON duration corresponding to the PDCCH-WUS (or the search space). The terminal device needs to detect DCI in the PDCCH within the ON duration (ON duration), and send the PUSCH or receive the PDSCH based on an indication of the DCI.

If the terminal device does not detect the PDCCH-WUS on the frequency domain resource (the search space), the terminal device may consider that there is no data used to schedule the terminal device within the ON duration corresponding to the frequency domain resource (the search space). The DCI in the PDCCH may not be detected, to reduce power consumption.

A new DCI format may be used to carry the PDCCH-WUS, and the PDCCH-WUS can indicate WUS information of at least one terminal device. The DCI format may be sent on a group common PDCCH (group common PDCCH), and detected on a common search space set.

To indicate the PDCCH-WUS by using the DCI, there are the following requirements: Because a detection block error ratio (BLER) of the PDCCH-WUS needs to be less than 0.1%, a size of the DCI format cannot be excessively large. Resource overheads consumed for indicating the PDCCH-WUS cannot be excessively high. Therefore, it is more advantageous to indicate the PDCCH-WUS by using group WUS DCI of the group common PDCCH. Based on indication characteristics of the PDCCH-WUS, a miss-detection rate is less than 0.1%, and a requirement on a false-detection rate is not strict. In this embodiment of this application, false detection means that a terminal device that does not need to be woken up is woken up.

A scenario in which the PDCCH-WUS is indicated by using the group WUS DCI of the group common PDCCH may have the following characteristics: A prerequisite for reducing power consumption by using the WUS function is that a service performed by the terminal device is bursty and sporadic; and if the service performed by the terminal device is not bursty and sporadic, the terminal device is woken up within most ON duration. Services of all terminal devices in a same cell need to be independent of each other, in other words, there is a low probability that a plurality of terminal devices simultaneously perform services within a same time period.

In other words, there may be a plurality of terminal devices (for example, N terminal devices) that need to simultaneously monitor the group WUS DCI, but a quantity of terminal devices that need to be simultaneously woken up is small (for example, M terminal devices that need to be simultaneously woken up, and M may be far less than N). Alternatively, it may be that only a small quantity of terminal devices that need to monitor the group WUS DCI are configured in a same cell.

When a DCI format of the group WUS DCI is designed, the M terminals in the N terminal devices (M may be far less than N) are woken up by using a small quantity of bits in a same piece of DCI.

Figure 6:
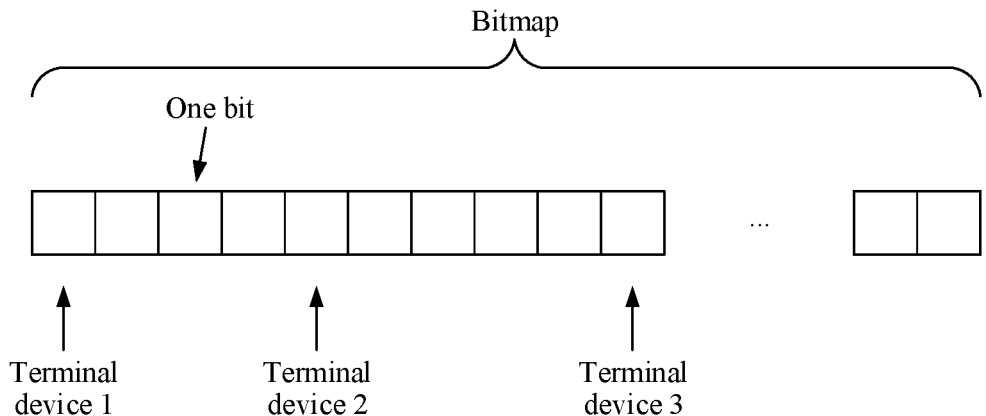
FIG. 6 is a schematic diagram of indicating a WUS of at least one terminal device by using a bitmap according to an embodiment of this application.

As shown in FIG. 6, in an existing solution, WUS DCI of the at least one terminal device is indicated by using a bitmap, and a wake-up indication of each terminal device corresponds to one bit at a unique fixed location. When the bit is set, it indicates that the terminal device is woken up. When the bit is not set, it indicates that the terminal device is not woken up. The fixed location is semi-statically configured by a network by using higher layer signaling. However, it is clear that the bitmap based on the fixed location cannot solve the following problem:

When a quantity of terminal devices configured for the group WUS DCI is not large, a manner of configuring the bit at the fixed location for each terminal device is preferable, and there is definitely no false detection (DCI cyclic redundancy check (CRC) false detection is not considered). However, when a quantity of terminal devices that need to send the group WUS DCI and that are supported in a cell is large, it is impractical to allocate the bit at the unique fixed location to each terminal device, because signaling overheads are excessively high.

A solution is to configure a plurality of terminal devices to share one bit. However, in this manner, false detection is consistently introduced among the terminals that share the one location, and it is difficult to achieve fairness for all the terminal devices. For example, if a terminal device 1 does not need to be frequently woken up but a terminal device 2 needs to be frequently woken up, when the two terminal devices shares one bit, the terminal device 1 is also frequently woken up. Consequently, false detection is generated.

Embodiments of this application provide a method and an apparatus for sending indication information. A location of a wake-up indication for a terminal device in WUS DCI is determined based on at least one of identification information of the terminal device or time information of a preset time period (for example, when the WUS DCI is a bitmap, the location may be a location of a bit in the bitmap), to implement random or pseudo-random distribution of locations of wake-up indications of different terminal devices in the WUS DCI, and achieve fairness for all the terminal devices as much as possible.

Figure 7:
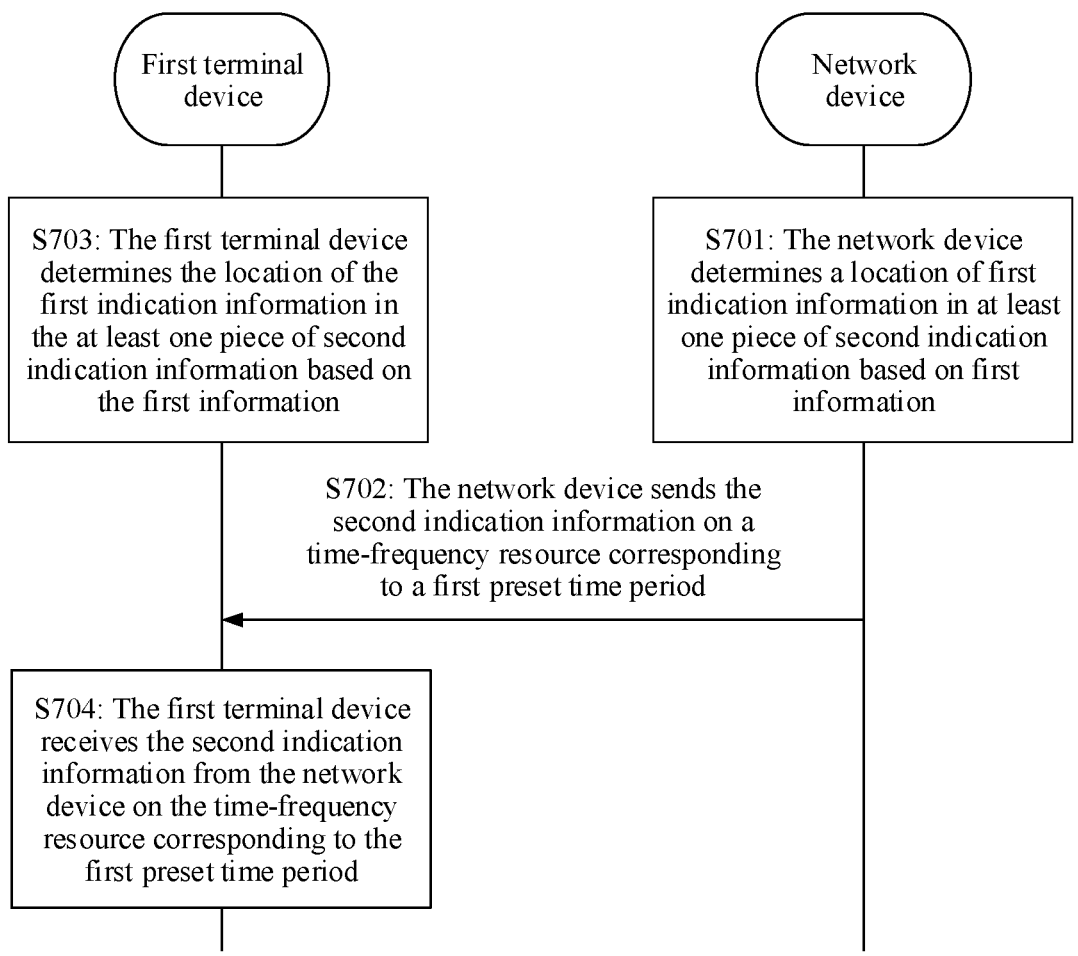
FIG. 7 is a schematic flowchart 1 of a method for sending indication information according to an embodiment of this application.

Specifically, as shown in FIG. 7, an embodiment of this application provides a method for sending indication information, including S701 to S704.

S701: A network device determines a location of first indication information in at least one piece of second indication information based on first information.

First, related content of the first information is described.

The first information may include at least one of identification information of a first terminal device and time information of a first preset time period. Optionally, the first information may further include a component carrier group identifier (CC group ID) of the first terminal device.

For example, the identification information of the first terminal device may be a C-RNTI or the like.

The time information of the first preset time period may include at least one of the following information: a slot number and a symbol number of the first preset time period, a number of a control resource set (CORESET) in a slot, and a number of a WUS monitoring occasion within the first preset time period. The number of the CORESET in the slot is useful for a case in which a plurality of WUS monitoring occasions are set in a same slot. For example, the plurality of WUS monitoring occasions in the same slot overlap each other in terms of time. In this case, the CORESET may be used as time information to distinguish these WUS monitoring occasions.

The first preset time period may be a time period including a wake-up signal occasion (WUS occasion), namely, a time period in which the network device sends group WUS DCI. In this embodiment of this application, the first preset time period is a time period described later in which the second indication information is sent.

The first terminal device is one of to-be-woken-up terminal devices that are within a discontinuous reception (DRX) outside active time (outside active time) period. In this embodiment of this application, the to-be-woken-up terminal device is a terminal device that needs to monitor the group WUS DCI described above. In other words, the to-be-woken-up terminal device not only supports a DRX function, but also performs a service that is bursty and sporadic. Services of to-be-woken-up terminal devices in a same cell need to be independent of each other.

The following describes related content of the first indication information and the second indication information.

The first indication information indicates the first terminal device to enter an inside active time period within a preset time period. The second indication information indicates the at least one to-be-woken-up terminal device to enter an inside active time period within a corresponding time period. Optionally, the second indication information may be indicated by using a bitmap, and first indication information of each terminal device may correspond to one bit in the bitmap.

As described above for the DRX mechanism, in this embodiment of this application, the inside active time period may also be referred to as a wake-up time period, a wake-up state, or the like. Therefore, in this embodiment of this application, unless otherwise specified, that the terminal device is indicated to enter the inside active time period within the corresponding time period is briefly referred to as waking up.

A quantity of to-be-woken-up terminal devices woken up by the second indication information is not limited in this embodiment of this application, and inside active time periods of the to-be-woken-up terminal devices are independent, in other words, may be the same or different. For example, there may be N to-be-woken-up terminal devices, and the second indication information may indicate to wake up all or some (for example, M terminal devices, and M may be far less than N) to-be-woken-up terminal devices.

Optionally, the to-be-woken-up terminal device indicated by the second indication information is a terminal device that is capable of entering the inside active time period within a second preset time period after the first preset time period. The second preset time period includes a start slot at which the terminal device enters the inside active time period, or the second preset time period includes any segment of consecutive slots at which the terminal device is within the inside active time period.

Figure 8:
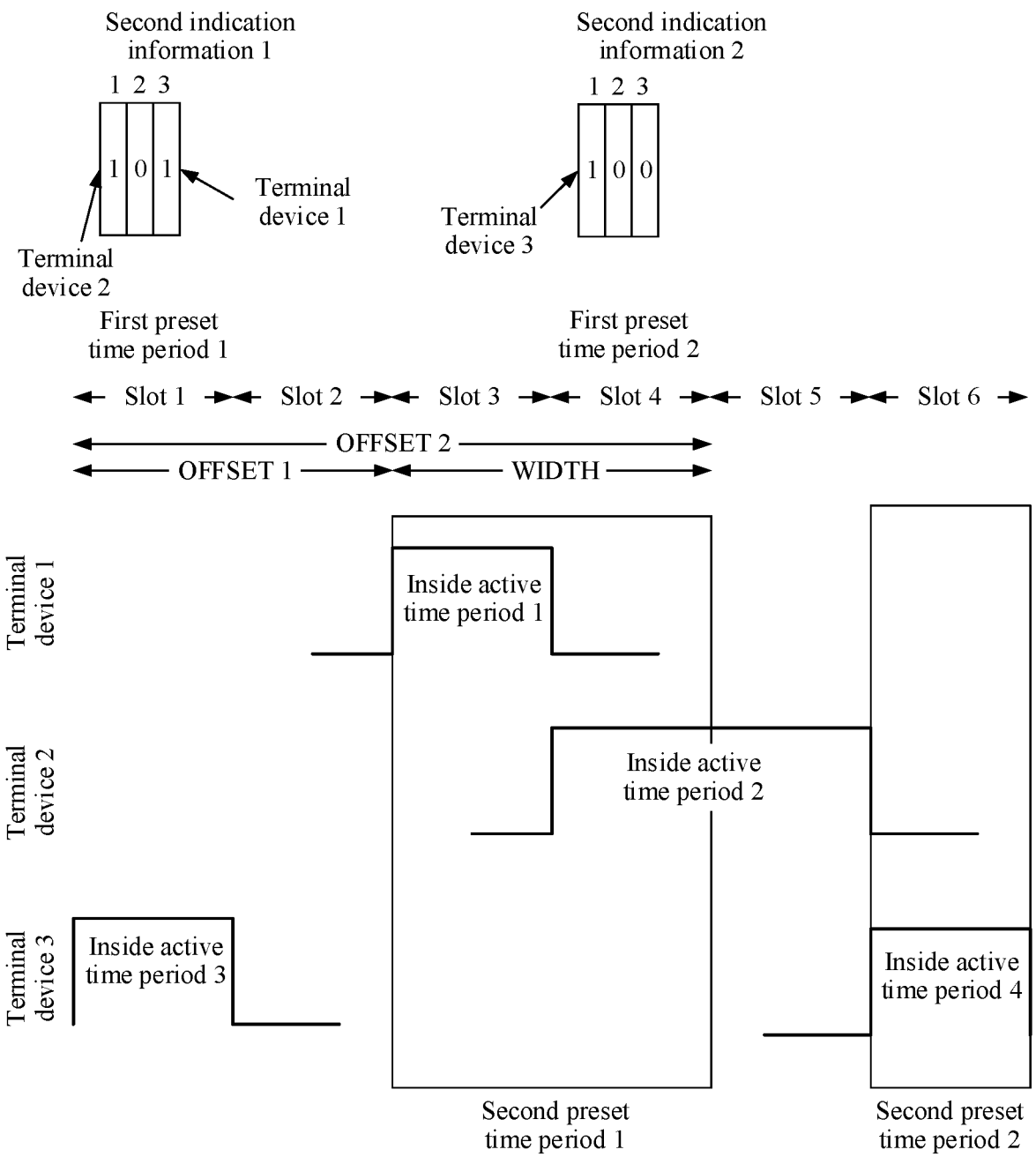
FIG. 8 is a schematic diagram in which second indication information indicates a terminal device to enter an inside active time period within a corresponding time period within a second preset time period after a first preset time period according to an embodiment of this application.

For example, as shown in FIG. 8, a time period for sending second indication information 1 is a first preset time period 1, and a time period for sending second indication information 2 is a first preset time period 2. A second preset time period 1 is after the first preset time period 1, and is not after the first preset time period 2. Therefore, to-be-woken-up terminal devices that may be indicated by the second indication information 1 include: a terminal device 1 that is capable of entering an inside active time period 1 within a corresponding time period within the second preset time period 1; and a terminal device 2 that is capable of entering an inside active time period 2 within a corresponding time period within the second preset time period 1. A second preset time period 2 is after the first preset time period 2. Therefore, to-be-woken-up terminal devices that may be indicated by the second indication information 2 include a terminal device 3 that is capable of entering an inside active time period 4 within a corresponding time period within the second preset time period 2.

It can be learned from that, the to-be-woken-up terminal devices indicated by the second indication information 1 may not include the terminal device 3 that is capable of entering the inside active time period 4 within the corresponding time period within the second preset time period 2, and a quantity of pieces of first indication information carried in the second indication information 1 may be reduced. In other words, to-be-woken-up terminal devices indicated by second indication information located in front may not include to-be-woken-up terminal devices that can be indicated by second indication information located behind, and a quantity of pieces of first indication information carried in the second indication information located in front may be reduced.

It should be noted that the time information of the second time period (for example, a time length, a start slot, and an end slot) may be determined based on offsets from that of the first time period. Specifically, the offsets include, for example, an offset between the start slot of the second time period and a start slot of the first time period, an offset between the end slot of the second time period and the start slot of the first time period, an offset between the start slot of the second time period and an end slot of the first time period, and an offset between the end slot of the second time period and the end slot of the first time period. For example, as shown in FIG. 8, an offset between a start slot of the second preset time period 1 and a start slot of the first preset time period 1 is OFFSET 1, and an offset between an end slot of the second preset time period 1 and the start slot of the first preset time period 1 is OFFSET 2. A time length of the second preset time period 1 is WIDTH=OFFSET 2–OFFSET 1.

In this embodiment of this application, a quantity of pieces of second indication information is not limited to one. A plurality of pieces of second indication information may include first indication information for a same terminal device, and locations of the first indication information for the same terminal device in the pieces of second indication information do not need to be the same. When the plurality of pieces of second indication information include the first indication information for the same terminal device, the location of the first indication information in each of the at least one piece of second indication information need to be determined based on the first information. When a terminal device has X pieces of second indication information before one piece of ON duration, a quantity of second indication information that includes first indication information for the terminal device may be less than X, or all the X pieces of second indication information include first indication information for the terminal device.

Optionally, if bits of first indication information for the first terminal device in all the pieces of second indication information are set, the first indication information indicates the first terminal device to enter the inside active time period within the preset time period. If a bit of first indication information for the first terminal device in any piece of second indication information is not set, the first terminal device does not enter the inside active time period (in other words, does not to be woken up) within the preset time period.

Figure 9:
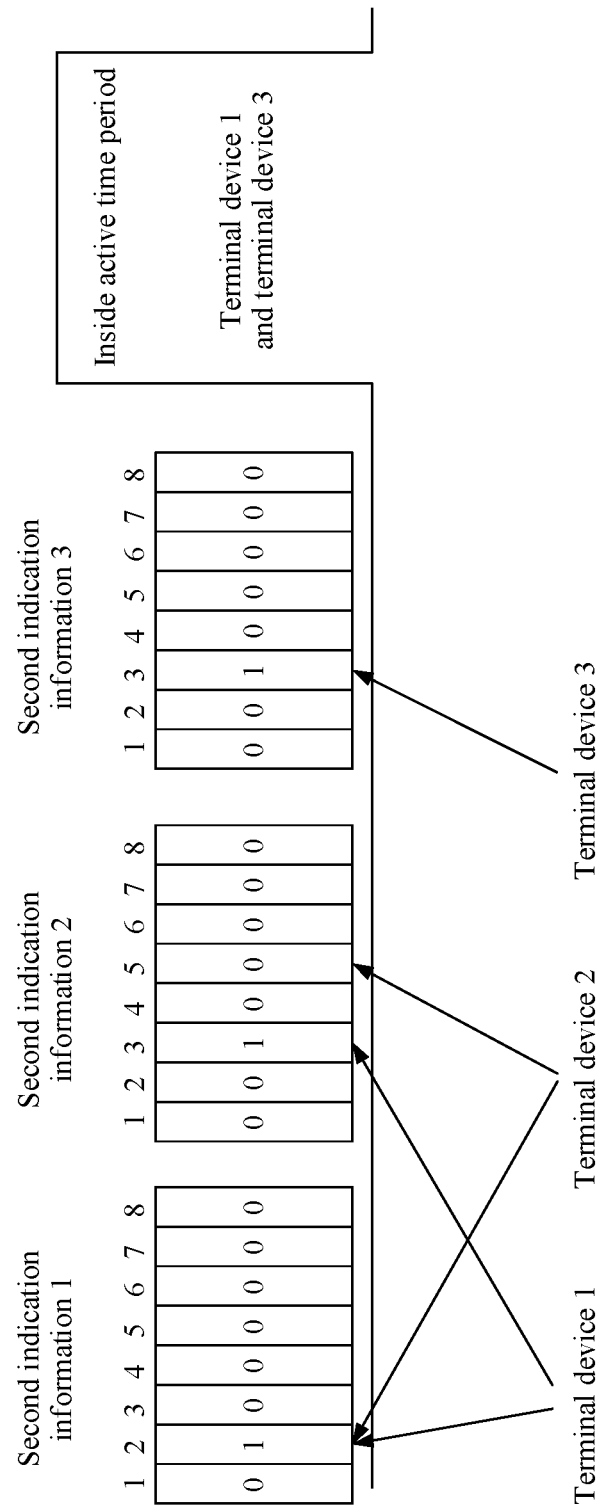
FIG. 9 is a schematic diagram 1 in which first indication information takes effect according to an embodiment of this application.
Figure 10:
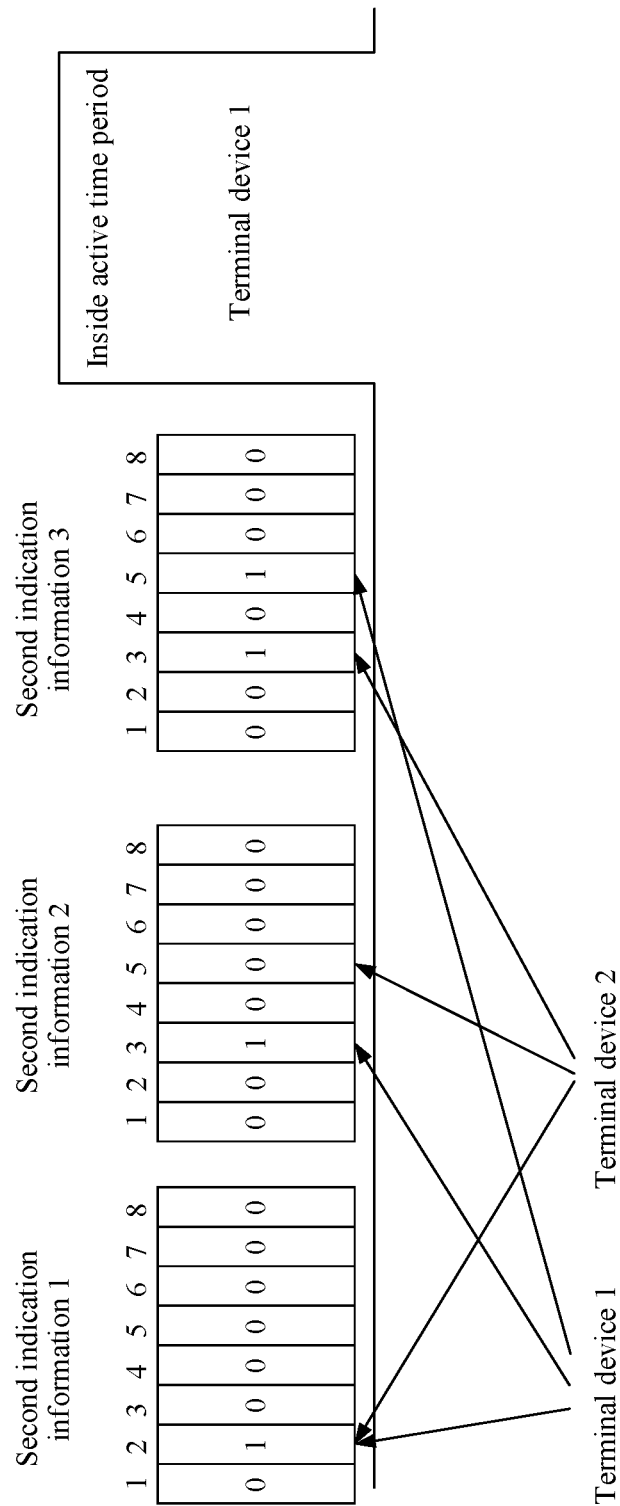
FIG. 10 is a schematic diagram 2 in which first indication information takes effect according to an embodiment of this application.

For example, as shown in FIG. 9 and FIG. 10, there are three pieces of second indication information: (the second indication information 1, the second indication information 2, and second indication information 3) An example in which each piece of second indication information is an 8-bit bitmap is used for description.

In FIG. 9, some pieces of second indication information include the first indication information for the same terminal device. Both the second indication information 1 and the second indication information 2 include first indication information for the terminal device 1 and first indication information for the terminal device 2, and the second indication information 3 includes first indication information for the terminal device 3. Bits of the first indication information for the terminal device 1 in the second indication information 1 and the second indication information 2 are all set, and bits of the first indication information for the terminal device 3 in the second indication information 3 are all set. Therefore, all the pieces of second indication information finally indicate the terminal device 1 and the terminal device 3 to separately enter an inside active time period within a corresponding preset time period. Bits of the first indication information for the terminal device 2 in the second indication information 1 are set, but bits of the first indication information for the terminal device 2 in the second indication information 2 are not set. Therefore, the terminal device 2 does not need to enter an inside active time period (in other words, the terminal device 2 does not need to be woken up) within a preset time period.

In FIG. 10, the plurality of pieces of second indication information all include the first indication information for the same terminal device. Bits of the first indication information for the terminal device 1 in the second indication information 1, the second indication information 2, and the second indication information 3 are all set. Therefore, all the pieces of second indication information finally indicate the terminal device 1 to enter the inside active time period within the preset time period. Bits of the first indication information for the terminal device 2 in the second indication information 1 and in the second indication information 3 are set, but the bits of the first indication information for the terminal device 2 in the second indication information 2 are not set. Therefore, the terminal device 2 does not need to enter the inside active time period (in other words, the terminal device 2 does not need to be woken up) within the preset time period. That is, a terminal device needs to be woken up within an inside active time period only when bits corresponding to first indication information in all pieces of second indication information associated with the terminal device are set.

In this embodiment of this application, the location of the first indication information in the at least one piece of second indication information is determined based on the identification information of the first terminal device and the time information of the first preset time period. The finally determined location changes with different pieces of identification information of the first terminal device and time information of the first preset time period. In addition, locations of the first indication information for the same terminal device in different pieces of second indication information may also be different. FIG. 9 or FIG. 10 is used as an example. If the location of the first indication information in the second indication information is fixed and only the second indication information 1 exists, the terminal device 1 and the terminal device 2 are simultaneously woken up, thereby causing false detection. Random or pseudo-random distribution of locations is implemented in this application, thereby greatly reducing a probability of false detection.

The following describes in detail how to determine the location of the first indication information in the at least one piece of second indication information based on the first information.

Specifically, the network device determines the location of the first indication information in the second indication information based on the first information when the to-be-woken-up terminal device meets a preset condition. The network device determines the location of the first indication information in the second indication information based on configuration information of the to-be-woken-up terminal device when the to-be-woken-up terminal device does not meet the preset condition.

That the to-be-woken-up terminal device meets the preset condition, for example, when a quantity of to-be-woken-up terminal devices meets the preset condition, may mean that the quantity of to-be-woken-up terminal devices is greater than a preset threshold. That the to-be-woken-up terminal device does not meet the preset condition, for example, the quantity of to-be-woken-up does not meet the preset condition, may mean that the quantity of to-be-woken-up terminal devices is less than or equal to the preset threshold. For example, the preset threshold may be a length of the second indication information (for example, a length of the bitmap). In other words, when the quantity of to-be-woken-up terminal devices is greater than the length of the second indication information, a plurality of terminal devices may share a same location, and fairness for all the terminal devices is ensured through random or pseudo-random distribution of the locations. When the quantity of to-be-woken-up terminal devices is less than the length of the second indication information, a fixed location may indicate the first indication information, to avoid the false detection.

Specifically, in a possible implementation, the location of the first indication information in the at least one piece of second indication information may be determined based on the identification information of the first terminal device and the time information of the first preset time period. For details, refer to formula 1:

$$Y_{p,nt} = (A_p * Y_{p,nt-1}) \bmod D \qquad \text{formula 1}$$

$A_p$ is a preset value, for example, $A_p$ may be a prime number, for example, 39827. nt is the time information of the first preset time period, for example, the slot (slot) number and the symbol (symbol) number of the first preset time period, the number of the CORESET in the slot, and the number of the wake-up signal monitoring occasion within the first preset time period; or a value obtained by any combination of the time information. D is a length of a single piece of second indication information. $Y_{p,nt}$ is a location of first indication information that is obtained after an iterative operation is performed on a previous $Y_{p,nt-1}$ according to formula 1 in the at least one piece of second indication information, where an initial value $Y_{p,-1}$ of the iterative operation is equal to the identification information of the first terminal device.

In another possible implementation, the location of the first indication information in the at least one piece of second indication information may be determined based on the identification information of the first terminal device. For details, refer to formula 2:

$$Y_{p,0} = (A_p * Y_{p,-1}) \bmod D \qquad \text{formula 2}$$

$A_p$ is the preset value, for example, $A_p$ may be 39827. D is the length of the single piece of second indication information. $Y_{p,-1}$ is equal to the identification information of the first terminal device. $Y_{p,0}$ is the obtained location of the first indication information in the at least one piece of second indication information.

In another possible implementation, the location of the first indication information in the at least one piece of second indication information may be determined based on the time information of the first preset time period. For details, refer to formula 3:

$$Y_{p,nt} = (A_p * Y_{p,nt-1}) \bmod D \qquad \text{formula 3}$$

$A_p$ is the preset value, for example, $A_p$ may be a prime number, for example, 39827. nt is the time information of the first preset time period, for example, the slot (slot) number and the symbol (symbol) number of the first preset time period, the number of the CORESET in the slot, and the number of the wake-up signal monitoring occasion within the first preset time period; or the value obtained by any combination of the time information. D is the length of the single piece of second indication information. $Y_{p,nt}$ is the location of the first indication information obtained after the iterative operation is performed on the previous $Y_{p,nt-1}$ according to formula 1 in the at least one piece of second indication information, where the initial value $Y_{p,-1}$ of the iterative operation is a constant.

Further, $A_p$ in formula 1 to formula 3 may be further adjusted based on the component carrier group identifier (CC group ID) of the first terminal device. In other words, different component carrier group identifiers indicate different values of $A_p$.

It can be learned from the foregoing formulas that when input of the formulas changes, output of the formulas also changes. When one of the identification information of the first terminal device and the time information of the first preset time period changes, locations of first indication information corresponding to different terminal devices may be different; and even locations of the first indication information for the same terminal device in different pieces of second indication information may be different. In this way, random or pseudo-random distribution of the locations is implemented.

The foregoing mapping manner is merely an example. The present invention is without loss of generality. A random function or a pseudo-random function may be used to generate locations of bits of the first indication information in the second indication information.

Figure 11:
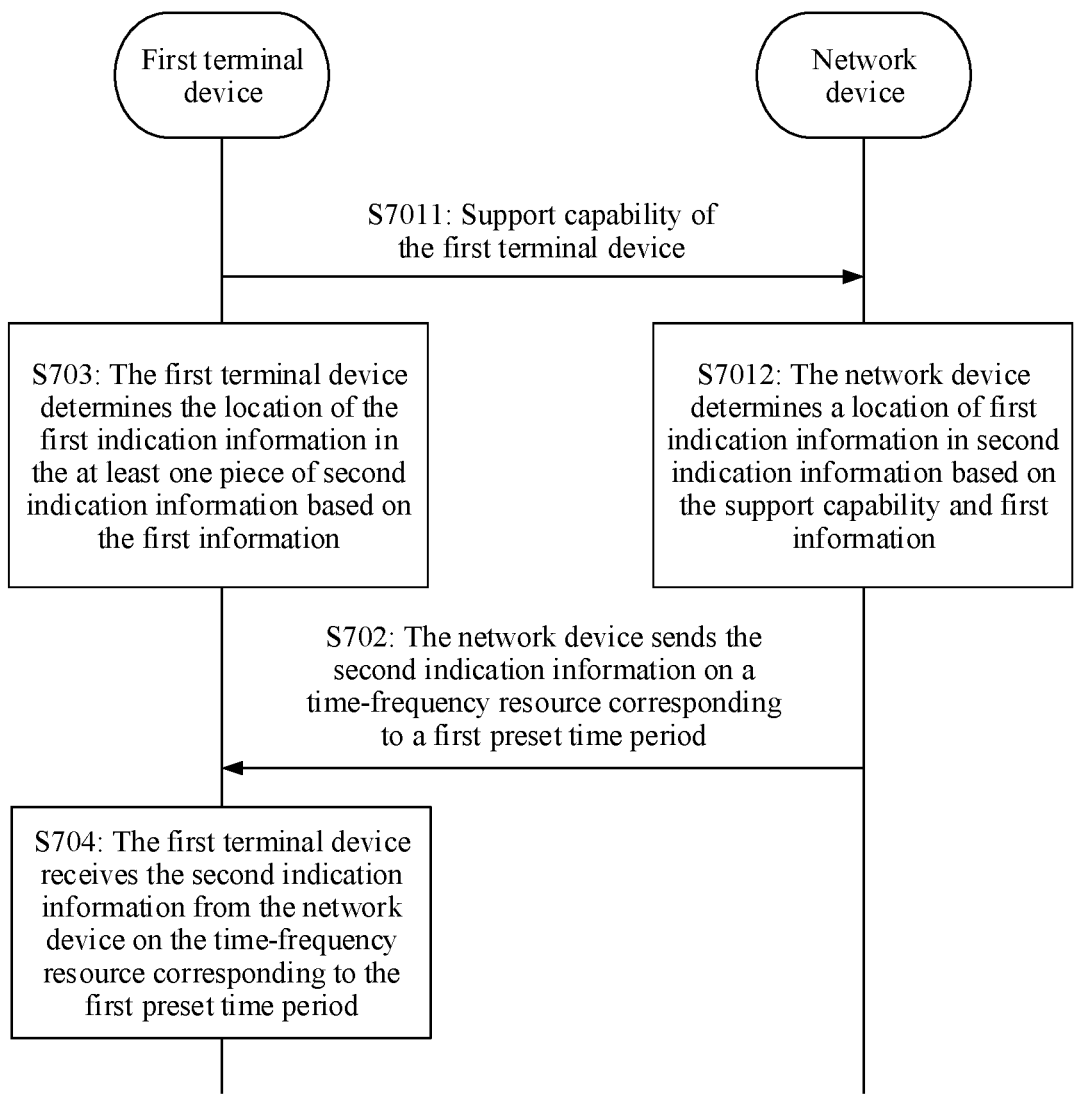
FIG. 11 is a schematic flowchart 2 of a method for sending indication information according to an embodiment of this application.

Optionally, as shown in FIG. 11, step S701 may include S7011 and S7012.

S7011: The first terminal device sends a support capability of the first terminal device to the network device.

Correspondingly, the network device may receive the support capability of the first terminal device from the first terminal device. The support capability of the first terminal device is whether an entire calculation process meets a delay requirement when the terminal device determines the location of the first indication information in the at least one piece of second indication information based on the first information.

S7012: The network device determines the location of the first indication information in the second indication information based on the support capability and the first information.

In particular, the network device determines the location of the first indication information in the second indication information based on the support capability and the first information when the to-be-woken-up terminal device meets the preset condition.

As described in the foregoing formula 1 to formula 3, an iterative operation needs to be performed when the location of the first indication information in the at least one piece of second indication information is determined based on the first information. If a calculation capability of the first terminal device is weak, the location of the first indication information in the second indication information cannot be determined based on the first information, and the first indication information can only be indicated in a fixed location manner.

For how to determine the location of the first indication information in the second indication information based on the first information, refer to the foregoing related descriptions. Details are not repeated herein.

Figure 12:
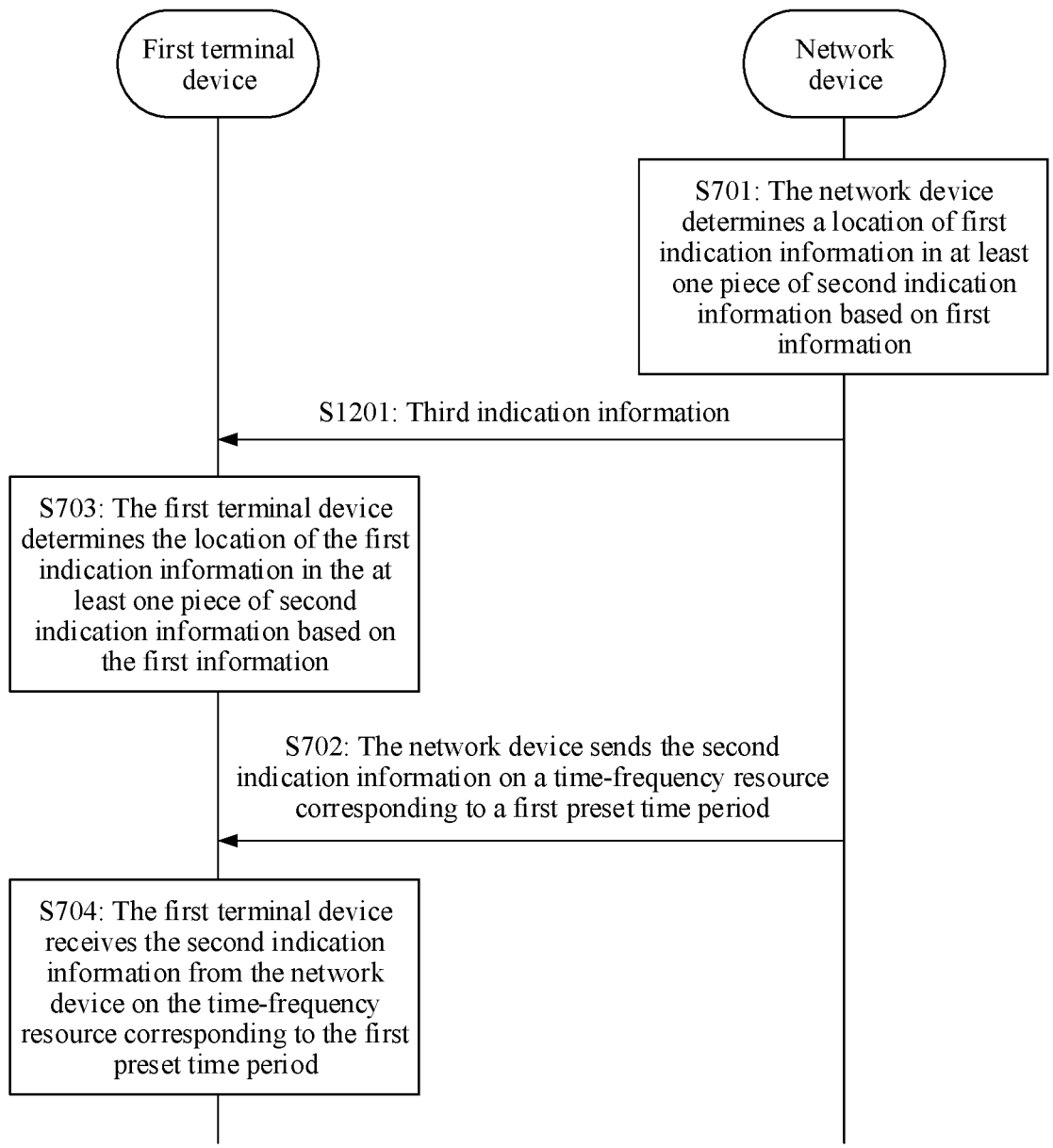
FIG. 12 is a schematic flowchart 3 of a method for sending indication information according to an embodiment of this application.

Optionally, as shown in FIG. 12, the method may further include S1201:

S1201: The network device sends third indication information to the first terminal device.

Correspondingly, the first terminal device receives the third indication information.

The third indication information indicates the first terminal device to determine the location of the first indication information in the second indication information based on the first information, in other words, indicate the first indication information in a pseudo-random location manner. Alternatively, the third indication information indicates the first terminal device to determine the location of the first indication information in the second indication information based on the configuration information, in other words, indicate the first indication information in the fixed location manner.

In other words, the third indication information indicates whether the network device expects the to-be-woken-up terminal device to determine the location of the first indication information in the second indication information based on the first information. For example, the third indication information indicates whether the to-be-woken-up terminal device meets the preset condition. The third indication information indicates the first terminal device to determine the location of the first indication information in the second indication information based on the first information when the to-be-woken-up terminal device meets the preset condition. The third indication information indicates the first terminal device to determine the location of the first indication information in the second indication information based on the configuration information of the to-be-woken-up terminal device when the to-be-woken-up terminal device does not meet the preset condition.

Optionally, the third indication information may be carried in a dynamic indication of DCI or in a radio resource control (RRC) message for the first terminal device.

S702: The network device sends the second indication information on a time-frequency resource corresponding to the first preset time period.

In other words, the network device may send the second indication information on a time-frequency resource corresponding to the WUS occasion.

S703: The first terminal device determines the location of the first indication information in the at least one piece of second indication information based on the first information.

As described above, after receiving the third indication information, the first terminal device may determine a manner in which the location of the first indication information in the at least one piece of second indication information is determined. That is, the first terminal device may determine the location of the first indication information in the second indication information based on the first information, in other words, indicate the first indication information in the pseudo-random location manner. Alternatively, the first terminal device may determine the location of the first indication information in the second indication information based on the configuration information, in other words, indicate the first indication information in the fixed location manner.

A manner in which the first terminal device determines the location of the first indication information in the at least one piece of second indication information based on the first information is similar to a manner in which the network device determines the location of the first indication information in the at least one piece of second indication information based on the first information. For details, refer to the foregoing description.

It should be noted that there is no execution sequence between step S703 and step S702. In addition, step S1201 and step S702 may be combined, in other words, the third indication information and the second indication information may be sent on a same time-frequency resource or same signaling. A typical example is a common PDCCH-WUS.

S704: The first terminal device receives the second indication information from the network device on the time-frequency resource corresponding to the first preset time period.

In other words, the first terminal device may receive the second indication information on the time-frequency resource corresponding to the WUS occasion. It should be noted that S1201 may also be performed before S701. For example, when the third indication information is carried in higher layer configuration signaling, the network configures and indicates the third indication information in S1201 in advance, and then the network sends the second indication information by performing S701.

According to the method for sending indication information provided in this embodiment of this application, the location of the first indication information in the at least one piece of second indication information is determined based on the first information. The first information includes the at least one of the identification information of the first terminal device and the time information of the first preset time period. The first terminal device is one of the to-be-woken-up terminal devices that are within the discontinuous reception outside active time period. The first indication information indicates the first terminal device to enter the inside active time period within the preset time period. The second indication information indicates the at least one to-be-woken-up terminal device to enter the inside active time period within the corresponding time period. It can be learned from foregoing description that, when one of the identification information of the first terminal device and the time information of the first preset time period changes, the locations of the first indication information corresponding to the different terminal devices may be different, and even the locations of the first indication information for the same terminal device in the different pieces of second indication information may also be different. In this way, random or pseudo-random distribution of the locations is implemented. WUSs of the terminal devices are pseudo-randomized, to achieve fairness for all the terminal devices as much as possible.

It may be understood that, in the foregoing embodiments, a method and/or steps implemented by the first terminal device may also be implemented by a component (for example, a chip or a circuit) that can be used in the first terminal device, and a method and/or steps implemented by the network device may also be implemented by a component that can be used in the network device.

The foregoing mainly describes the solutions provided in the embodiments of this application from a perspective of interaction between network elements. Correspondingly, an embodiment of this application further provides a communication apparatus. The communication apparatus is configured to implement the foregoing method. The communication apparatus may be the first terminal device in the foregoing method embodiment, or an apparatus including the first terminal device, or a chip or a functional module in the first terminal device. Alternatively, the communication apparatus may be the network device in the foregoing method embodiment, or an apparatus including the network device, or a chip or a functional module in the network device. It can be understood that, to implement the foregoing functions, the communication apparatus includes a corresponding hardware structure and/or software module for executing the functions. A person skilled in the art should easily be aware that, in combination with units and algorithm steps of the examples described in the embodiments disclosed in this specification, this application may be implemented by hardware or a combination of hardware and computer software. Whether a function is executed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communication apparatus may be divided into functional modules based on the foregoing method embodiment. For example, each functional module may be obtained through division based on each corresponding function, or two or more functions may be integrated into one processing module. The integrated module may be implemented in a form of hardware, or may be implemented in a form of a software functional module. It should be noted that in the embodiments of this application, division into the modules is an example and is merely logical function division, and may be other division manner in an actual implementation.

Figure 13:
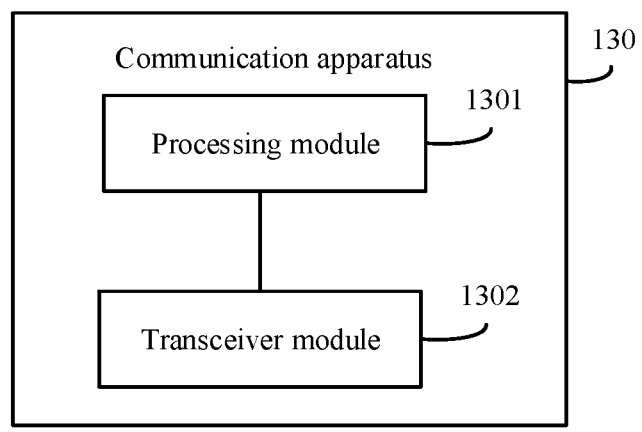
FIG. 13 is a schematic diagram 1 of a structure of a communication apparatus according to an embodiment of this application.

For example, the communication apparatus is the first terminal device in the foregoing method embodiment. FIG. 13 is a schematic diagram of a structure of a communication apparatus 130. The communication apparatus 130 includes a processing module 1301 and a transceiver module 1302. The transceiver module 1302 may also be referred to as a transceiver unit, and includes a sending unit and/or a receiving unit. For example, the transceiver module 1302 may be a transceiver circuit, a transceiver, or a communication interface; and is configured to implement a sending function and/or a receiving function of the first terminal device in the foregoing method embodiment. For example, the transceiver module 1302 performs step S704 in FIG. 7, steps S7011 and S704 in FIG. 11, and steps S704 and S1201 in FIG. 12. The processing module 1301 is configured to perform data processing, to implement a processing function of the first terminal device in the foregoing method embodiment. For example, the processing module 1301 performs step S703 in FIG. 7, step S703 in FIG. 11, and step S703 in FIG. 12.

For example, the processing module 1301 is configured to determine a location of first indication information in at least one piece of second indication information based on first information, where the first information includes at least one of identification information of a first terminal device and time information of a first preset time period, the first terminal device is one of to-be-woken-up terminal devices that are within a discontinuous reception outside active time period, and the first indication information indicates the first terminal device to enter an inside active time period within a preset time period.

The transceiver module 1302 is configured to send the second indication information on a time-frequency resource corresponding to the first preset time period, where the second indication information indicates at least one to-be-woken-up terminal device to enter an inside active time period within a corresponding time period.

In a possible implementation, the processing module 1301 is specifically configured to determine the location of the first indication information in the second indication information based on the first information when the to-be-woken-up terminal device meets a preset condition.

In a possible implementation, the processing module 1301 is further configured to determine the location of the first indication information in the second indication information based on configuration information of the to-be-woken-up terminal device when the to-be-woken-up terminal device does not meet the preset condition.

In a possible implementation, the transceiver module 1302 is further configured to receive a support capability of the first terminal device from the first terminal device; and the processing module is further configured to determine the location of the first indication information in the second indication information based on the support capability and the first information when the to-be-woken-up terminal device meets the preset condition.

In a possible implementation, the transceiver module 1302 is further configured to send third indication information to the first terminal device, where the third indication information indicates the first terminal device to determine the location of the first indication information in the second indication information based on the first information, or indicate the first terminal device to determine the location of the first indication information in the second indication information based on the configuration information.

In a possible implementation, the third indication information is carried in a dynamic indication of downlink control information DCI or in a radio resource control RRC message for the first terminal device.

In a possible implementation, the to-be-woken-up terminal device indicated by the second indication information is a terminal device that is capable of entering the inside active time period within the corresponding time period within a second preset time period after the first preset time period.

In a possible implementation, the second indication information is indicated by using a bitmap, and first indication information of each terminal device corresponds to one bit in the bitmap.

In a possible implementation, if bits of first indication information for the first terminal device in all pieces of second indication information are set, the first indication information indicates the first terminal device to enter the inside active time period within the preset time period.

In a possible implementation, the first information further includes a component carrier group identifier of the first terminal device.

In a possible implementation, the time information of the first preset time period includes at least one of the following information: a slot number and a symbol number of the first preset time period, a number of a CORESET in a slot, and a number of a wake-up signal monitoring occasion within the first preset time period.

In this embodiment, the communication apparatus 130 is presented in a form of functional modules obtained through integration. The "module" herein may be a specific ASIC, a circuit, a processor that executes one or more software or firmware programs, a memory, an integrated logic circuit, and/or another component capable of providing the foregoing functions. In a simple embodiment, a person skilled in the art may figure out that the communication apparatus 130 may be in a form of the terminal device 105 shown in FIG. 2.

For example, the processor 180 in the terminal device 105 shown in FIG. 2 may invoke the computer-executable instructions stored in the memory 120, to enable the terminal device 105 to perform the method in the foregoing method embodiment.

Specifically, the processor 180 in the terminal device 105 shown in FIG. 2 may invoke the computer-executable instructions stored in the memory 120, to implement functions/an implementation process of the transceiver module 1302 in FIG. 13. Alternatively, the RF circuit 110 in the terminal device 105 shown in FIG. 2 may implement the functions/implementation process of the transceiver module 1302 in FIG. 13.

Because the communication apparatus 130 provided in this embodiment may perform the foregoing method, for a technical effect that can be achieved by the communication apparatus 130, refer to the foregoing method embodiment. Details are not described herein again.

Figure 14:
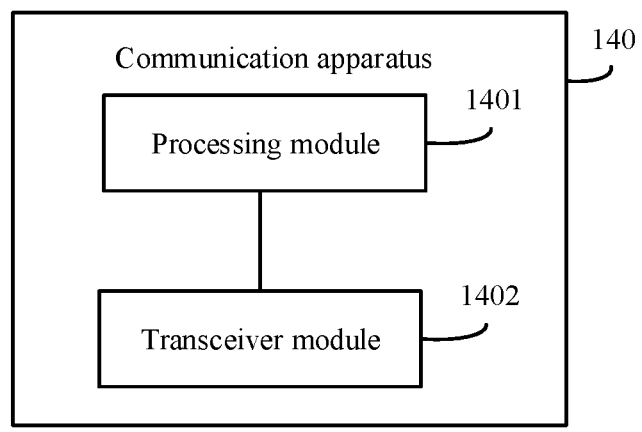
FIG. 14 is a schematic diagram 2 of a structure of a communication apparatus according to an embodiment of this application.

For example, the communication apparatus is the network device in the foregoing method embodiment. FIG. 14 is a schematic diagram of a structure of a communication apparatus 140. The communication apparatus 140 includes a processing module 1401 and a transceiver module 1402. The transceiver module 1402 may also be referred to as a transceiver unit, and includes a sending unit and/or a receiving unit. For example, the transceiver module 1402 may be a transceiver circuit, a transceiver, or a communication interface; and is configured to implement a sending function and/or a receiving function of the network device in the foregoing method embodiment. For example, the transceiver module 1402 performs step S702 in FIG. 7, steps S7011 and S702 in FIG. 11, and steps S702 and S1201 in FIG. 12. The processing module 1401 is configured to perform data processing, to implement a processing function performed by the network device in the foregoing method embodiment. For example, the processing module 1401 performs step S701 in FIG. 7, step S7012 in FIG. 11, and step S701 in FIG. 12.

For example, the processing module 1401 is configured to determine a location of first indication information in at least one piece of second indication information based on first information, where the first information includes at least one of identification information of a first terminal device and time information of a first preset time period, the first terminal device is one of to-be-woken-up terminal devices that are within a discontinuous reception outside active time period, and the first indication information indicates the first terminal device to enter an inside active time period within a preset time period.

The transceiver module 1402 is configured to receive the second indication information from a network device on a time-frequency resource corresponding to the first preset time period, where the second indication information indicates at least one to-be-woken-up terminal device to enter an inside active time period within a corresponding time period.

In a possible implementation, the transceiver module is further configured to send a support capability of the first terminal device to the network device.

In a possible implementation, the transceiver module 1402 is further configured to receive third indication information from the network device, where the third indication information indicates the first terminal device to determine the location of the first indication information in the second indication information based on the first information, or indicate the first terminal device to determine the location of the first indication information in the second indication information based on configuration information of the terminal device.

In a possible implementation, the third indication information is carried in a dynamic indication of downlink control information DCI or in a radio resource control RRC message for the first terminal device.

In a possible implementation, the to-be-woken-up terminal device indicated by the second indication information is a terminal device that is capable of entering the inside active time period within the corresponding time period within a second preset time period after the first preset time period.

In a possible implementation, the second indication information is indicated by using a bitmap, and first indication information of each terminal device corresponds to one bit in the bitmap.

In a possible implementation, if bits of first indication information for the first terminal device in all pieces of second indication information are set, the first indication information indicates the first terminal device to enter the inside active time period within the preset time period.

In a possible implementation, the first information further includes a component carrier group identifier of the first terminal device.

In a possible implementation, the time information of the first preset time period includes at least one of the following information: a slot number and a symbol number of the first preset time period, a number of a CORESET in a slot, and a number of a wake-up signal monitoring occasion within the first preset time period.

In this embodiment, the communication apparatus 140 is presented in a form of functional modules obtained through integration. The "module" herein may be a specific ASIC, a circuit, a processor that executes one or more software or firmware programs, a memory, an integrated logic circuit, and/or another component capable of providing the foregoing functions. In a simple embodiment, a person skilled in the art may figure out that the communication apparatus 140 may be in a form of the network device 300 shown in FIG. 3.

For example, the processor 321 in the network device 300 shown in FIG. 3 may invoke computer-executable instructions stored in the memory 322, to enable the network device 300 to perform the method in the foregoing method embodiment.

Specifically, the processor 321 in the network device 300 shown in FIG. 3 may invoke the computer-executable instructions stored in the memory 322, to implement functions/an implementation process of the transceiver module 1402 in FIG. 14. Alternatively, the RF circuit 312 in the network device 300 shown in FIG. 3 may implement the functions/implementation process of the transceiver module 1402 in FIG. 14.

Because the communication apparatus 140 provided in this embodiment may perform the foregoing method, for a technical effect that can be achieved by the communication apparatus 140, refer to the foregoing method embodiment. Details are not described herein again.

An embodiment of this application further provides a communication apparatus. The communication apparatus includes a processor, a memory, and a transceiver. The processor is coupled to the memory. When executing a computer program or instructions in the memory, the processor performs the method corresponding to the first terminal device or the network device in FIG. 7, FIG. 11, and FIG. 12.

An embodiment of this application further provides a chip, including a processor and an interface, configured to invoke a computer program stored in a memory from the memory and run the computer program, to perform the method corresponding to the first terminal device or the network device in FIG. 7, FIG. 11, and FIG. 12.

An embodiment of this application further provides a computer-readable storage medium. The computer-readable storage medium stores instructions. When the instructions are run on a computer or a processor, the computer or the processor is enabled to perform the method corresponding to the first terminal device or the network device in FIG. 7, FIG. 11, and FIG. 12.

An embodiment of this application further provides a computer program product including instructions. When the instructions are run on a computer or a processor, the computer or the processor is enabled to perform the method corresponding to the first terminal device or the network device in FIG. 7, FIG. 11, and FIG. 12.

An embodiment of this application provides a chip system. The chip system includes a processor, used by a communication apparatus to perform the method corresponding to the first terminal device or the network device in FIG. 7, FIG. 11, and FIG. 12.

In a possible design, the chip system further includes a memory. The memory is configured to store program instructions and data that are necessary for the terminal device. The chip system may include a chip and an integrated circuit, or may include a chip and another discrete device. This is not specifically limited in this embodiment of this application.

The communication apparatus, the chip, the computer storage medium, the computer program product, or the chip system provided in this application are all configured to perform the foregoing method. Therefore, for beneficial effects that can be achieved by the communication apparatus, the chip, the computer storage medium, the computer program product, or the chip system, refer to beneficial effects in the foregoing implementations. Details are not described herein again.

The processor in the embodiments of this application may be a chip. For example, the processor may be a field programmable gate array (FPGA), an application-specific integrated chip (ASIC), a system on chip (SoC), a central processing unit (CPU), a network processor (NP), a digital signal processing circuit (DSP), a micro controller unit (MCU), a programmable controller (programmable logic device. PLD), or another integrated chip.

The memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, a plurality of forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that, the memory in the system and method described in this specification includes but is not limited to these memories and any memory of another proper type.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are executed by the hardware or the software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, device, and method may be implemented in other manners. For example, the described device embodiment is merely an example. For example, division into the units is merely logical function division and may be other division in actual implementation. For example, a plurality of units or components may be combined or integrated into another system, or some characteristics may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions in the embodiments.

In addition, functional units in the embodiments of this application may be integrated into one processing unit, or each of the units may exist alone physically, or two or more units are integrated into one unit.

All or some of the foregoing embodiments may be implemented through software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for sending indication information, comprising:
   determining, by a network device, a location of first indication information in at least one piece of second indication information based on first information, wherein the first information comprises at least one of identification information of a first terminal device and time information of a first preset time period, the first terminal device is one of to-be-woken-up terminal devices that are within a discontinuous reception outside active time period, and the first indication information indicates the first terminal device to enter an inside active time period within a preset time period; and
   sending, by the network device, the second indication information on a time-frequency resource corresponding to the first preset time period, wherein the second indication information indicates at least one to-be-woken-up terminal device to enter an inside active time period within a corresponding time period.

2. The method according to claim 1, wherein the determining, by the network device, the location of the first indication information in the at least one piece of second indication information based on the first information comprises:
   determining, by the network device, the location of the first indication information in the second indication information based on the first information based on the to-be-woken-up terminal device meeting a preset condition; or
   determining, by the network device, the location of the first indication information in the second indication information based on configuration information of the to-be-woken-up terminal device based on the to-be-woken-up terminal device not meeting the preset condition.

3. The method according to claim 2, wherein the determining, by the network device, the location of the first indication information in the second indication information based on the first information based on the to-be-woken-up terminal device meeting the preset condition comprises:
   receiving, by the network device, a support capability of the first terminal device from the first terminal device; and
   determining, by the network device, the location of the first indication information in the second indication information based on the support capability and the first information based on the to-be-woken-up terminal device meeting the preset condition.

4. The method according to claim 1, wherein the second indication information is indicated by using a bitmap, and first indication information of each terminal device corresponds to one bit in the bitmap.

5. The method according to claim 1, wherein based on bits of first indication information for the first terminal device in all pieces of second indication information being set, the first indication information indicates the first terminal device to enter the inside active time period within the preset time period.

6. A method for sending indication information, comprising:
   determining, by a first terminal device, a location of first indication information in at least one piece of second indication information based on first information, wherein the first information comprises at least one of identification information of the first terminal device and time information of a first preset time period, the first terminal device is one of to-be-woken-up terminal devices that are within a discontinuous reception outside active time period, and the first indication information indicates the first terminal device to enter an inside active time period within a preset time period; and receiving, by the first terminal device, the second indication information from a network device on a time-frequency resource corresponding to the first preset time period, wherein the second indication information indicates at least one to-be-woken-up terminal device to enter an inside active time period within a corresponding time period.

7. The method according to claim 6, wherein the method further comprises:

sending, by the first terminal device, a support capability of the first terminal device to the network device.

8. The method according to claim 6, wherein the method further comprises:

receiving, by the first terminal device, third indication information from the network device, wherein the third indication information indicates the first terminal device to determine the location of the first indication information in the second indication information based on the first information, or indicate the first terminal device to determine the location of the first indication information in the second indication information based on configuration information of the terminal device.

9. The method according to claim 6, wherein the second indication information is indicated by using a bitmap, and first indication information of each terminal device corresponds to one bit in the bitmap.

10. The method according to claim 6, wherein based on bits of first indication information for the first terminal device in all pieces of second indication information being set, the first indication information indicates the first terminal device to enter the inside active time period within the preset time period.

11. A communication apparatus, comprising:

at least one processor; and a memory storing programming instructions for execution by the at least one processor, the programming instructions instructing the network device to perform operations comprising:

determining a location of first indication information in at least one piece of second indication information based on first information, wherein the first information comprises at least one of identification information of a first terminal device and time information of a first preset time period, the first terminal device is one of to-be-woken-up terminal devices that are within a discontinuous reception outside active time period, and the first indication information indicates the first terminal device to enter an inside active time period within a preset time period; and sending the second indication information on a time-frequency resource corresponding to the first preset time period, wherein the second indication information indicates at least one to-be-woken-up terminal device to enter an inside active time period within a corresponding time period.

12. The apparatus according to claim 11, wherein the determining the location of the first indication information in the at least one piece of second indication information based on the first information comprises:

determining the location of the first indication information in the second indication information based on the first information based on the to-be-woken-up terminal device meeting a preset condition; or determining the location of the first indication information in the second indication information based on configuration information of the to-be-woken-up terminal device based on the to-be-woken-up terminal device not meeting the preset condition.

13. The apparatus according to claim 12, wherein the operations further comprises:

receiving a support capability of the first terminal device from the first terminal device; and determining the location of the first indication information in the second indication information based on the support capability and the first information based on the to-be-woken-up terminal device meeting the preset condition.

14. The apparatus according to claim 12, wherein the operations further comprises:

sending third indication information to the first terminal device, wherein the third indication information indicates the first terminal device to determine the location of the first indication information in the second indication information based on the first information, or indicate the first terminal device to determine the location of the first indication information in the second indication information based on the configuration information.

15. The apparatus according to claim 12, wherein based on bits of first indication information for the first terminal device in all pieces of second indication information being set, the first indication information indicates the first terminal device to enter the inside active time period within the preset time period.

16. A communication apparatus, comprising:

at least one processor; and a memory storing programming instructions for execution by the at least one processor, the programming instructions instructing the network device to perform operations comprising:

determining a location of first indication information in at least one piece of second indication information based on first information, wherein the first information comprises at least one of identification information of a first terminal device and time information of a first preset time period, the first terminal device is one of to-be-woken-up terminal devices that are within a discontinuous reception outside active time period, and the first indication information indicates the first terminal device to enter an inside active time period within a preset time period; and receiving the second indication information from a network device on a time-frequency resource corresponding to the first preset time period, wherein the second indication information indicates at least one to-be-woken-up terminal device to enter an inside active time period within a corresponding time period.

17. The apparatus according to claim 16, wherein the operations further comprises:

sending a support capability of the first terminal device to the network device.

18. The apparatus according to claim 16, wherein the operations further comprises:

receiving third indication information from the network device, wherein the third indication information indicates the first terminal device to determine the location of the first indication information in the second indication information based on the first information, or indicate the first terminal device to determine the location of the first indication information in the second indication information based on configuration information of the terminal device.

19. The apparatus according to claim 16, wherein the second indication information is indicated by using a bitmap, and first indication information of each terminal device corresponds to one bit in the bitmap.

20. The apparatus according to claim 16, wherein based on bits of first indication information for the first terminal device in all pieces of second indication information being set, the first indication information indicates the first terminal device to enter the inside active time period within the preset time period.

\* \* \* \* \*